US008782560B2

(12) United States Patent  
Purdy et al.

(10) Patent No.: US 8,782,560 B2  
(45) Date of Patent: Jul. 15, 2014

(54) RELATIVE ITEM OF INTEREST EXPLORER INTERFACE

(75) Inventors: Sean T. Purdy, Durham, NC (US); Kenneth Jennings, Raleigh, NC (US); Ravi Reddy Katpelly, Cary, NC (US); Steven L. Petersen, Los Gatos, CA (US)

(73) Assignee: Waldeck Technology, LLC, Wilmington, DE (US)

( * ) Notice: Subject to any disclaimer, the term of this patent is extended or adjusted under 35 U.S.C. 154(b) by 150 days.

(21) Appl. No.: 12/976,595

(22) Filed: Dec. 22, 2010

(65) Prior Publication Data

US 2012/0066646 A1    Mar. 15, 2012

Related U.S. Application Data

(60) Provisional application No. 61/289,107, filed on Dec. 22, 2009.

(51) Int. Cl.  
*G06F 3/048* (2013.01)

(52) U.S. Cl.  
USPC ............ 715/834; 715/810; 715/802; 715/823

(58) Field of Classification Search  
None  
See application file for complete search history.

(56) References Cited

U.S. PATENT DOCUMENTS

| | | | |
|---|---|---|---|
| 5,539,232 A | 7/1996 | Nakanishi et al. | |
| 5,682,525 A | 10/1997 | Bouve et al. | |
| 5,977,974 A * | 11/1999 | Hatori et al. | 715/839 |
| 6,002,406 A * | 12/1999 | Zhao | 345/581 |
| 6,014,090 A | 1/2000 | Rosen et al. | |
| 6,204,844 B1 | 3/2001 | Fumarolo et al. | |
| 6,240,069 B1 | 5/2001 | Alperovich et al. | |
| 6,392,661 B1 * | 5/2002 | Tankersley | 345/660 |
| 6,456,234 B1 | 9/2002 | Johnson | |
| 6,490,587 B2 | 12/2002 | Easty et al. | |

(Continued)

FOREIGN PATENT DOCUMENTS

| EP | 1463354 | 12/2005 |
|---|---|---|
| WO | WO 2008/000046 | 1/2008 |

(Continued)

OTHER PUBLICATIONS

Jankun-Kelly, T.J. et al., "MoireGraphs: Radial Focus+Context Visualization and Interaction for Graphs with Visual Nodes", Oct. 21, 2003, IEEE, Information Visualization 2003, pp. 59-66.*

(Continued)

*Primary Examiner* — Weilun Lo  
*Assistant Examiner* — Stella Eun

(57) ABSTRACT

Systems and methods are disclosed for providing a Graphical User Interface (GUI) for representing a reference item and a number of items of interest. In one embodiment, each item of interest is assigned to one of a number of concentric regions in a two-dimensional space based on one or more attributes of the item of interest. The concentric regions in the two-dimensional space are centered at a location in the two-dimensional space that corresponds to the reference item. A GUI is then generated such that the GUI includes concentric display regions that correspond to the concentric regions in the two-dimensional space, where a select concentric display region provides an expanded view of the items of interest located within the corresponding region in the two-dimensional space and the remaining concentric display region(s) provide collapsed view(s) of the items of interest in the corresponding region(s) of the two-dimensional space.

19 Claims, 25 Drawing Sheets

(56) References Cited

U.S. PATENT DOCUMENTS

| | | | |
|---|---|---|---|
| 6,529,136 B2 | 3/2003 | Cao et al. | |
| 6,559,872 B1* | 5/2003 | Lehikoinen et al. | 715/856 |
| 6,606,504 B1 | 8/2003 | Mooney et al. | |
| 6,650,326 B1* | 11/2003 | Huber et al. | 345/428 |
| 6,708,172 B1 | 3/2004 | Wong et al. | |
| 6,819,919 B1 | 11/2004 | Tanaka | |
| 6,907,345 B2* | 6/2005 | Shipley et al. | 701/455 |
| 6,968,179 B1 | 11/2005 | De Vries | |
| 6,987,885 B2 | 1/2006 | Gonzalez-Banos et al. | |
| 7,096,431 B2* | 8/2006 | Tambata et al. | 715/834 |
| 7,111,788 B2* | 9/2006 | Reponen | 235/472.01 |
| 7,116,985 B2 | 10/2006 | Wilson et al. | |
| 7,123,918 B1 | 10/2006 | Goodman | |
| 7,130,740 B2 | 10/2006 | Vanegas et al. | |
| 7,158,798 B2 | 1/2007 | Lee et al. | |
| 7,162,471 B1 | 1/2007 | Knight et al. | |
| 7,224,361 B2* | 5/2007 | Aguera y Arcas | 345/428 |
| 7,236,739 B2 | 6/2007 | Chang | |
| 7,247,024 B2 | 7/2007 | Bright et al. | |
| 7,272,357 B2 | 9/2007 | Nishiga et al. | |
| 7,272,489 B2* | 9/2007 | Tu | 701/438 |
| 7,280,822 B2 | 10/2007 | Fraccaroli | |
| 7,386,318 B2 | 6/2008 | Moon et al. | |
| 7,398,081 B2 | 7/2008 | Moran | |
| 7,403,990 B2 | 7/2008 | Nishiyama et al. | |
| 7,418,268 B1 | 8/2008 | Cabano et al. | |
| 7,423,580 B2 | 9/2008 | Markhovsky et al. | |
| 7,444,315 B2 | 10/2008 | Wu | |
| 7,444,655 B2 | 10/2008 | Sardera | |
| 7,509,131 B2 | 3/2009 | Krumm et al. | |
| 7,515,136 B1 | 4/2009 | Kanesky et al. | |
| 7,558,404 B2 | 7/2009 | Ma et al. | |
| 7,587,409 B2* | 9/2009 | Yakowenko et al. | 1/1 |
| 7,620,404 B2 | 11/2009 | Chesnais et al. | |
| 7,680,959 B2 | 3/2010 | Svendsen | |
| 7,685,192 B1 | 3/2010 | Scofield et al. | |
| 7,710,420 B2* | 5/2010 | Nonclercq et al. | 345/440 |
| 7,777,730 B2* | 8/2010 | Geurts et al. | 345/173 |
| 7,787,886 B2 | 8/2010 | Markhovsky et al. | |
| 7,822,426 B1 | 10/2010 | Wuersch | |
| 7,844,283 B2 | 11/2010 | Riise et al. | |
| 7,849,082 B2 | 12/2010 | Westphal | |
| 7,992,102 B1* | 8/2011 | De Angelo | 715/834 |
| 8,000,726 B2* | 8/2011 | Altman et al. | 455/456.3 |
| 8,010,601 B2 | 8/2011 | Jennings et al. | |
| 8,073,461 B2* | 12/2011 | Altman et al. | 455/456.1 |
| 8,149,248 B2* | 4/2012 | Ko et al. | 345/660 |
| 8,208,943 B2 | 6/2012 | Petersen et al. | |
| 8,225,225 B2* | 7/2012 | Jetha et al. | 715/769 |
| 8,229,458 B2* | 7/2012 | Busch | 455/456.1 |
| 8,265,658 B2 | 9/2012 | Issa et al. | |
| 8,275,397 B2* | 9/2012 | Huston | 455/461 |
| 8,370,770 B2* | 2/2013 | Vance et al. | 715/834 |
| 8,549,432 B2* | 10/2013 | Warner | 715/834 |
| 2001/0013009 A1 | 8/2001 | Greening et al. | |
| 2002/0010628 A1 | 1/2002 | Burns | |
| 2002/0049690 A1 | 4/2002 | Takano | |
| 2002/0054117 A1* | 5/2002 | van Dantzich et al. | 345/766 |
| 2002/0086676 A1 | 7/2002 | Hendrey et al. | |
| 2002/0087335 A1 | 7/2002 | Meyers et al. | |
| 2002/0087632 A1 | 7/2002 | Keskar | |
| 2002/0130906 A1* | 9/2002 | Miyaki | 345/837 |
| 2003/0005056 A1 | 1/2003 | Yamamoto et al. | |
| 2003/0109288 A1 | 6/2003 | Carley et al. | |
| 2003/0143988 A1 | 7/2003 | Jamadagni | |
| 2003/0148775 A1 | 8/2003 | Spriestersbach et al. | |
| 2004/0009750 A1 | 1/2004 | Beros et al. | |
| 2004/0025185 A1 | 2/2004 | Goci et al. | |
| 2004/0054428 A1 | 3/2004 | Sheha et al. | |
| 2004/0181668 A1 | 9/2004 | Blew et al. | |
| 2004/0192331 A1 | 9/2004 | Gorday et al. | |
| 2004/0243306 A1* | 12/2004 | Han | 701/211 |
| 2005/0038876 A1 | 2/2005 | Chaudhuri | |
| 2005/0070298 A1 | 3/2005 | Caspi et al. | |
| 2005/0096030 A1 | 5/2005 | Boyd et al. | |
| 2005/0174975 A1 | 8/2005 | Mgrdechian et al. | |
| 2005/0210387 A1 | 9/2005 | Alagappan et al. | |
| 2005/0231425 A1 | 10/2005 | Coleman et al. | |
| 2005/0249023 A1 | 11/2005 | Bodlaender | |
| 2005/0278317 A1 | 12/2005 | Gross et al. | |
| 2006/0046743 A1 | 3/2006 | Mirho | |
| 2006/0059096 A1 | 3/2006 | Dublish et al. | |
| 2006/0085383 A1 | 4/2006 | Mantle et al. | |
| 2006/0095865 A1* | 5/2006 | Rostom | 715/810 |
| 2006/0123462 A1 | 6/2006 | Lunt et al. | |
| 2006/0161599 A1 | 7/2006 | Rosen | |
| 2006/0166679 A1 | 7/2006 | Karaoguz et al. | |
| 2006/0195361 A1 | 8/2006 | Rosenberg | |
| 2006/0200490 A1 | 9/2006 | Abbiss | |
| 2006/0212537 A1 | 9/2006 | Hans et al. | |
| 2006/0247853 A1 | 11/2006 | Jung et al. | |
| 2006/0256959 A1 | 11/2006 | Hymes | |
| 2006/0270419 A1 | 11/2006 | Crowley et al. | |
| 2006/0270421 A1 | 11/2006 | Phillips et al. | |
| 2006/0282303 A1 | 12/2006 | Hale et al. | |
| 2007/0005419 A1 | 1/2007 | Horvitz et al. | |
| 2007/0015518 A1 | 1/2007 | Winter et al. | |
| 2007/0018983 A1* | 1/2007 | Vimme | 345/440 |
| 2007/0030824 A1 | 2/2007 | Ribaudo et al. | |
| 2007/0032242 A1 | 2/2007 | Goodman | |
| 2007/0075898 A1 | 4/2007 | Markhovsky et al. | |
| 2007/0082676 A1 | 4/2007 | Bhogal et al. | |
| 2007/0135138 A1 | 6/2007 | Brown et al. | |
| 2007/0142065 A1 | 6/2007 | Richey et al. | |
| 2007/0149214 A1 | 6/2007 | Walsh et al. | |
| 2007/0150444 A1 | 6/2007 | Chesnais et al. | |
| 2007/0167174 A1 | 7/2007 | Halcrow et al. | |
| 2007/0174243 A1 | 7/2007 | Fritz | |
| 2007/0179863 A1 | 8/2007 | Stoll | |
| 2007/0203644 A1 | 8/2007 | Thota et al. | |
| 2007/0210937 A1 | 9/2007 | Smith et al. | |
| 2007/0216665 A1* | 9/2007 | Jha et al. | 345/184 |
| 2007/0218900 A1 | 9/2007 | Abhyanker | |
| 2007/0219659 A1 | 9/2007 | Abhyanker et al. | |
| 2007/0225904 A1* | 9/2007 | Pantalone et al. | 701/207 |
| 2007/0233379 A1 | 10/2007 | Bowman et al. | |
| 2007/0233671 A1 | 10/2007 | Oztekin et al. | |
| 2007/0234234 A1* | 10/2007 | Leidig et al. | 715/825 |
| 2007/0255785 A1 | 11/2007 | Hayashi et al. | |
| 2007/0281689 A1 | 12/2007 | Altman et al. | |
| 2007/0281690 A1 | 12/2007 | Altman et al. | |
| 2007/0282621 A1 | 12/2007 | Altman et al. | |
| 2007/0290832 A1 | 12/2007 | Kalinichenko et al. | |
| 2008/0005688 A1 | 1/2008 | Najdenovski | |
| 2008/0009327 A1 | 1/2008 | Westwood et al. | |
| 2008/0016018 A1 | 1/2008 | Malik | |
| 2008/0016205 A1 | 1/2008 | Svendsen | |
| 2008/0052945 A1 | 3/2008 | Matas et al. | |
| 2008/0076418 A1 | 3/2008 | Beyer, Jr. | |
| 2008/0086741 A1 | 4/2008 | Feldman et al. | |
| 2008/0097999 A1 | 4/2008 | Horan | |
| 2008/0106599 A1 | 5/2008 | Liu et al. | |
| 2008/0113674 A1 | 5/2008 | Baig | |
| 2008/0118106 A1 | 5/2008 | Kilambi et al. | |
| 2008/0126476 A1 | 5/2008 | Nicholas et al. | |
| 2008/0140650 A1 | 6/2008 | Stackpole | |
| 2008/0146250 A1 | 6/2008 | Aaron | |
| 2008/0153427 A1 | 6/2008 | O'Shaughnessy et al. | |
| 2008/0155080 A1 | 6/2008 | Marlow et al. | |
| 2008/0162037 A1 | 7/2008 | Hasan Mahmoud | |
| 2008/0182563 A1 | 7/2008 | Wugofski et al. | |
| 2008/0182591 A1 | 7/2008 | Krikorian | |
| 2008/0188261 A1 | 8/2008 | Arnone | |
| 2008/0222295 A1 | 9/2008 | Robinson et al. | |
| 2008/0227473 A1 | 9/2008 | Haney | |
| 2008/0242317 A1 | 10/2008 | Abhyanker | |
| 2008/0250312 A1 | 10/2008 | Curtis | |
| 2008/0288355 A1 | 11/2008 | Rosen | |
| 2008/0295037 A1* | 11/2008 | Cao et al. | 715/852 |
| 2008/0306826 A1 | 12/2008 | Kramer et al. | |
| 2008/0318597 A1 | 12/2008 | Berns et al. | |
| 2009/0023410 A1 | 1/2009 | Ghosh | |
| 2009/0024315 A1 | 1/2009 | Scheibe | |
| 2009/0030999 A1 | 1/2009 | Gatzke et al. | |

(56) References Cited

U.S. PATENT DOCUMENTS

| | | | |
|---|---|---|---|
| 2009/0037355 A1 | 2/2009 | Brave et al. | |
| 2009/0047972 A1 | 2/2009 | Neeraj | |
| 2009/0048777 A1* | 2/2009 | Ebert et al. | 701/212 |
| 2009/0076894 A1 | 3/2009 | Bates et al. | |
| 2009/0082038 A1 | 3/2009 | McKiou et al. | |
| 2009/0100363 A1* | 4/2009 | Pegg et al. | 715/765 |
| 2009/0110302 A1* | 4/2009 | Snow | 382/225 |
| 2009/0112467 A1 | 4/2009 | Jiang et al. | |
| 2009/0113296 A1 | 4/2009 | Lacy et al. | |
| 2009/0115570 A1 | 5/2009 | Cusack, Jr. | |
| 2009/0115617 A1 | 5/2009 | Sano et al. | |
| 2009/0125321 A1 | 5/2009 | Charlebois et al. | |
| 2009/0132441 A1* | 5/2009 | Muller et al. | 706/11 |
| 2009/0132652 A1 | 5/2009 | Athale et al. | |
| 2009/0138346 A1 | 5/2009 | Kalaboukis et al. | |
| 2009/0144211 A1 | 6/2009 | O'Sullivan et al. | |
| 2009/0150501 A1 | 6/2009 | Davis et al. | |
| 2009/0164431 A1 | 6/2009 | Zivkovic et al. | |
| 2009/0164459 A1* | 6/2009 | Jennings et al. | 707/5 |
| 2009/0164641 A1 | 6/2009 | Rogers et al. | |
| 2009/0169060 A1* | 7/2009 | Faenger et al. | 382/113 |
| 2009/0201896 A1 | 8/2009 | Davis et al. | |
| 2009/0210480 A1 | 8/2009 | Sivasubramaniam et al. | |
| 2009/0254865 A1* | 10/2009 | Siegel | 715/835 |
| 2009/0287783 A1 | 11/2009 | Beare et al. | |
| 2009/0307263 A1 | 12/2009 | Skibiski et al. | |
| 2010/0004857 A1 | 1/2010 | Pereira et al. | |
| 2010/0017261 A1 | 1/2010 | Evans et al. | |
| 2010/0020776 A1 | 1/2010 | Youssef et al. | |
| 2010/0030740 A1 | 2/2010 | Higgins et al. | |
| 2010/0036807 A1* | 2/2010 | Lieske et al. | 707/3 |
| 2010/0058212 A1* | 3/2010 | Belitz et al. | 715/766 |
| 2010/0130226 A1 | 5/2010 | Arrasvuori et al. | |
| 2010/0151821 A1 | 6/2010 | Sweeney et al. | |
| 2010/0197219 A1 | 8/2010 | Issa et al. | |
| 2010/0197318 A1 | 8/2010 | Petersen et al. | |
| 2010/0197319 A1 | 8/2010 | Petersen et al. | |
| 2010/0198814 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2011/0010650 A1* | 1/2011 | Hess et al. | 715/765 |
| 2011/0047509 A1* | 2/2011 | Arrasvuori | 715/815 |
| 2011/0136506 A1 | 6/2011 | Stewart | |
| 2011/0307174 A1* | 12/2011 | Uusitalo | 701/300 |
| 2012/0041983 A1 | 2/2012 | Jennings | |
| 2012/0063427 A1 | 3/2012 | Kandekar et al. | |
| 2012/0066138 A1 | 3/2012 | Curtis et al. | |
| 2012/0066302 A1 | 3/2012 | Petersen et al. | |
| 2012/0072495 A1 | 3/2012 | Jennings et al. | |

FOREIGN PATENT DOCUMENTS

| | | |
|---|---|---|
| WO | WO 2009/039350 | 3/2009 |
| WO | 2009/055501 A1 | 4/2009 |
| WO | WO 2009/077655 | 6/2009 |

OTHER PUBLICATIONS

"Apple—iPhone—Download thousands of iPhone applications," at <http://www.apple.com/iphone/apps-for-iphone/>, printed Aug. 17, 2009, 2 pages.

"Apple—iPhone—View all the features of the new iPhone 3GS," at <http://www.apple.com/iphone/iphone-3gs/>, printed Aug. 11, 2009, 5 pages.

"Apple—iPod touch—Features," at <http://www.apple.com/ipodtouch/features/>, printed Aug. 13, 2009, 2 pages.

"Apple—MacBook—White polycarbonate 13-inch MacBook," at <http://www.apple.com/macbook/>, printed Aug. 17, 2009, 2 pages.

"BlackBerry—New BlackBerry PDA Smartphones—New Cell Phones & Smart Phones," at <http://na.blackberry.com/eng/devices/>, printed Aug. 17, 2009, 1 page.

"HP TouchSmart tx2 Notebook PC," at <http://www.hp.com/united-states/campaigns/touchsmart/notebook/index.html>, copyright 2009, Hewlett-Packard Development Company, L.P., printed Aug. 17, 2009, 1 page.

Sakwerda, Bart, "Concept of the time adaptable GUI for the mobile phone users," from <http://www.mobileuserexperience.com/mexdesign/200805_bart_sakwerda_student_entry.pdf>, Mobile User Experience 2008 entry, printed Aug. 17, 2009, 4 pages.

"Turn cell off silent remotely," post from IpIpIpIp on Mar. 17, 2007, at <http://www.whynot.net/ideas/3546>, copyright Barry Nalebuff & Ian Ayres, printed Apr. 21, 2011, 3 pages.

"Where GPS Mobile Application, iPhone App & Location Based Services Development . . . ," at <http://where.com/>, copyright 2008, uLocate Communications, Inc., printed Aug. 17, 2009, 2 pages.

Vigueras, G. et al., "A comparative study of partitioning methods for crowd simulations," Applied Soft Computing, vol. 10, Issue 1, Jan. 2010, available online Jul. 22, 2009, pp. 225-235, 12 pages.

Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

Anciaux, N. et al., "Data Degradation: Making Private Data Less Sensitive Over Time," CIKM 2008, Oct. 26-30, 2008, Napa Valley, California, 2 pages.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

"Final: OpenID Attribute Exchange 1.0—Final," at <http://openid.net/specs/openid-attribute-exchange-1_0.html>, Dec. 5, 2007, printed May 11, 2012, 11 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Fire Eagle," at <http://fireeagle.yahoo.net>, copyright 2007-2011, Yahoo! Inc., printed Apr. 28, 2011, 2 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"Friend of a Friend (FOAF) project," at <http://www.foaf-project.org/>, from the Internet Archive dated May 26, 2008, printed Aug. 10, 2012, 2 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"About Loopt," at <http://about.loopt.com/>, printed May 3, 2011, 4 pages.

"Loopt—About Us," at <https://loopt.com/loopt/aboutUs.aspx>, from the Internet Archive, dated Jun. 29, 2007, copyright 2007, Loopt, Inc., 1 page.

(56) References Cited

OTHER PUBLICATIONS

"MobiClique," copyright 2007-2009, Thomson, originally found at <http://www.thlab.net/~apietila/mobiclique/>, printed Oct. 23, 2009, 5 pages.

Abstract, Ratti, C. et al., "Mobile Landscapes: using location data from cell phones for urban analysis," Environment and Planning B: Planning and Design, vol. 33, No. 5, 2006, pp. 727-748, 1 page.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

"Plazes—Right Plaze, Right Time," at <http://plazes.com>, copyright 2004-2011, Plazes AG, printed May 3, 2011, 2 pages.

Miller, B. N. et al., "PocketLens: Toward a Personal Recommender System," ACM Transactions on Information Systems, vol. 22, No. 3, Jul. 2004, pp. 437-476, 40 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55-60, 6 pages.

"Resource Description Framework (RDF) / W3C Semantic Web Activity," at <http://www.w3.org/RDF/>, from the Internet Archive dated Jul. 30, 2008, printed Aug. 10, 2012, 6 pages.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Sense Networks—Machine Learning," at <http://www.sensenetworks.com/machine_learning.php>, copyright 2008-2009, Sense Networks, printed Jan. 12, 2009, 2 pages.

"Sense Networks—Technology," at <http://www.sensenetworks.com/technology.php>, copyright 2008-2009, Sense Networks, printed Jan. 12, 2009, 2 pages.

"Sense Networks—The Minimum Volume Embedding Algorithm," at <http://www.sensenetworks.com/mve_algorithm.php>, copyright 2008-2009, Sense Networks, printed Jan. 12, 2009, 2 pages.

Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.

"Six degrees of separation," at <http://en.wikipedia.org/wiki/Six_degrees_of_separation>, last modified on Apr. 19, 2011, printed Apr. 28, 2011, 11 pages.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.

"What is LinkedIn?," at <http://www.linkedin.com/static?key=what_is_linkedin&trk=hb_what>, copyright 2011, LinkedIn Corporation, printed Apr. 28, 2011, 1 page.

Bettini, C. et al., "A Distributed Architecture for Management and Retrieval of Extended Points of Interest," In Proceedings of the 25th IEEE International Conference on Distributed Computing Systems—Workshops (ICDCS 2005 Workshops), Jun. 6-10, 2005, Columbus, Ohio, IEEE Computer Society, 2005, pp. 266-272, 7 pages.

Miluzzo, E. et al., "CaliBree: A Self-calibration System for Mobile Sensor Networks," S. Nikoletseas et al. (Eds.), DCOSS 2008, LNCS 5067, copyright 2008, Springer-Verlag Berlin Heidelberg, pp. 314-331, 18 pages.

"cellity Address book 2.0," Presentation, Mobile Media Summit, Medienforum nrw, Koln, Jun. 24, 2009, cellity AG, Hamburg, Germany, 18 pages.

Campbell, A. T. et al., "CenceMe: Injecting Sensing Presence into Social Network Applications using Mobile Phones (Demo Abstract)," In Proc. of Ninth ACM International Symposium on Mobile Ad Hoc Networking and Computing (MobiHoc '08), Hong Kong, May 27-30, 2008, 2 pages.

Miluzzo, E. et al., "CenceMe—Injecting Sensing Presence into Social Networking Applications," G. Kortuem et al., (Eds.), EuroSSC, 2007, LNCS 4793, pp. 1-28, copyright 2007, Springer-Verlag Berlin Heidelberg, 28 pages.

"Chrysanth Diary Writing," at <http://www.netimediary.com/diarysoftware/>, copyright Chrysanth Software, printed Aug. 17, 2009, 3 pages.

Behrend, Andreas, et al., "Data Stream Analysis for Location-Aware Collaborative Information Retrieval," Proceedings of the 12th East European Conference on Advances in Databases and Information Systems, Sep. 5-9, 2008, Pori, Finland, 16 pages.

Agostini, A. et al., "Demo: Ontology-based Context-aware Delivery of Extended Points of Interest," 6th International Conference on Mobile Data Management (MDM'05), Ayia Napa, Cyprus, May 9-13, 2005, copyright 2005, ACM, 2 pages.

Acroterion, "Knowledge Base Social Network Applications," available at <http://www.acroterion.ca/Knowledge_Base_Social_Network_Applications.html>, copyright 2001-2005, printed Dec. 21, 2011, 2 pages.

Abstract, Yu et al., "Recommendation System Using Location-Based Ontology on Wireless Internet: An Example of Collective Intelligence by Using 'Mashup' Applications," Expert Systems with Applications, vol. 36, Issue 9, pp. 11675-11681, Nov. 2009, abstract printed May 13, 2009, 3 pages.

\* cited by examiner

NEW BOUNDING BOX

NEW BOUNDING BOX

US 8,782,560 B2

1

RELATIVE ITEM OF INTEREST EXPLORER INTERFACE

RELATED APPLICATIONS

This application claims the benefit of provisional patent application Ser. No. 61/289,107, filed Dec. 22, 2009, the disclosure of which is hereby incorporated herein by reference in its entirety.

FIELD OF THE DISCLOSURE

The present disclosure relates to a Graphical User Interface (GUI) and more specifically relates to a GUI for representing a reference item and a number of items of interest.

BACKGROUND

Many services provided to users give the users access to vast amounts of data. For instance, many location-based services provide information to users regarding Points of Interest (POIs) that are near the users' current locations. Other services provide information to users regarding other users or crowds of users near the users' current locations. The vast amount of data returned to the users by such services can be overwhelming. This problem is further compounded by the often limited screen space available on mobile devices on which the data can be displayed. Thus, there is a need for an intuitive interface that enables a user to understand, navigate, and utilize vast amounts of data.

SUMMARY

The present disclosure relates to a Graphical User Interface (GUI) for representing a reference item and a number of items of interest. In one embodiment, each item of interest is assigned to one of a number of concentric regions in a two-dimensional space based on one or more attributes of the item of interest. The concentric regions in the two-dimensional space are centered at a location in the two-dimensional space that corresponds to the reference item. A GUI is then generated to represent the reference item and the items of interest such that the GUI includes a number of concentric display regions that correspond to the concentric regions in the two-dimensional space, where a select one of the concentric display regions provides an expanded view of the items of interest located within the corresponding region in the two-dimensional space and the remaining one(s) of the concentric display regions provide collapsed view(s) of the items of interest in the corresponding region(s) of the two-dimensional space. Presentation of the GUI to a user is then effected. In one embodiment, the GUI is generated at a user device of the user and presentation of the GUI is effected by presenting the GUI to the user via a display of the user device. In another embodiment, the GUI is generated at a server computer connected to a user device of the user via a network, and presentation of the GUI to the user is effected by sending the GUI to the user device of the user via the network.

In another embodiment, the reference item is a reference location and the items of interest are crowds of users located at or near the reference location. Each crowd is assigned to one of a number of concentric geographic regions centered at the reference location based on the location of the crowd. A GUI is then generated and presented such that the GUI includes a number of concentric display regions that correspond to the concentric geographic regions, where a select one of the concentric display regions provides an expanded

2 view of the crowds located in the corresponding geographic region and the remaining one(s) of the concentric display regions provide collapsed view(s) of the crowds located in the corresponding geographic region(s).

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
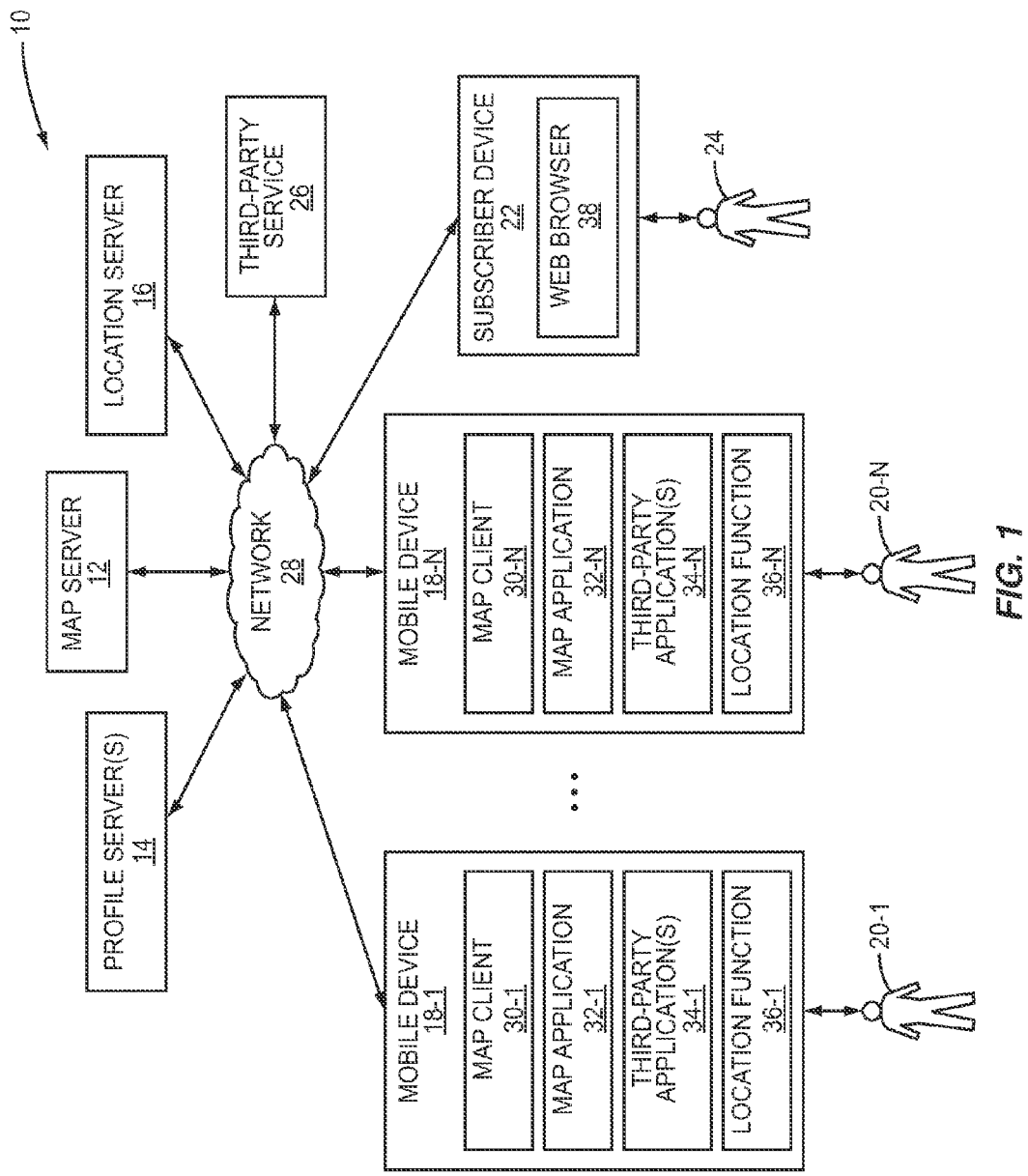
FIG. 1 illustrates a Mobile Aggregate Profile (MAP) system according to one embodiment of the present disclosure.
Figure 6:
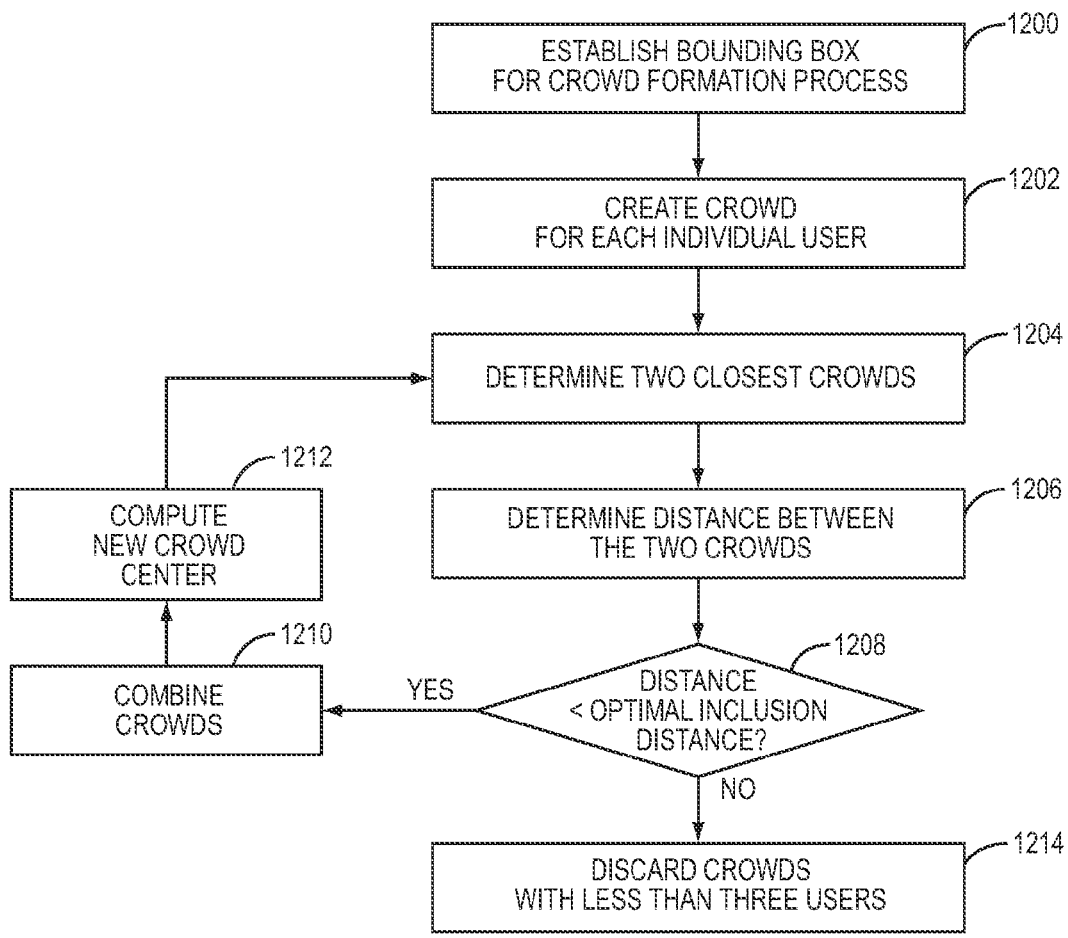
FIG. 6 is a flow chart for a spatial crowd formation process according to one embodiment of the present disclosure.
Figure 12:
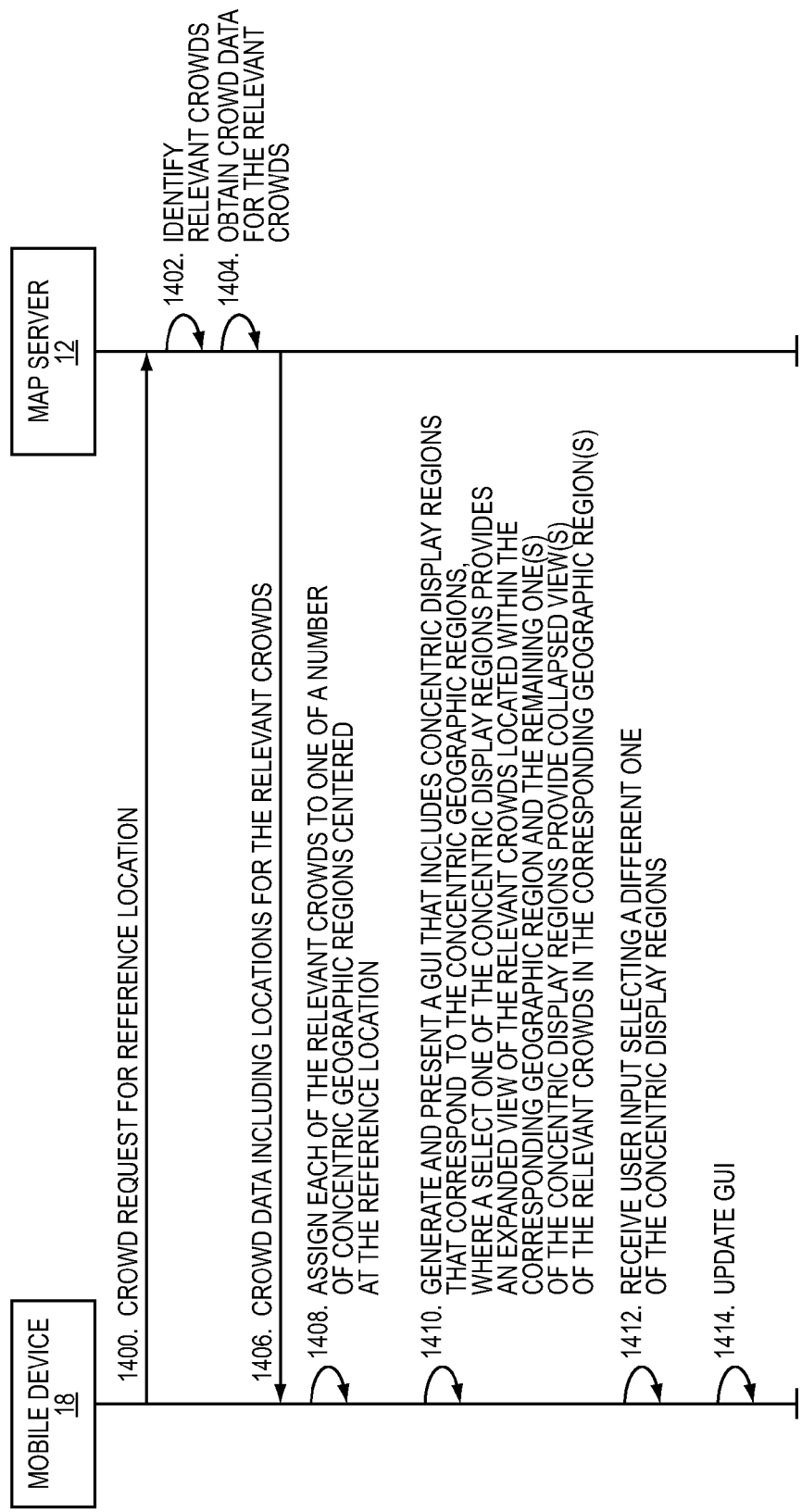
Figure 13A:
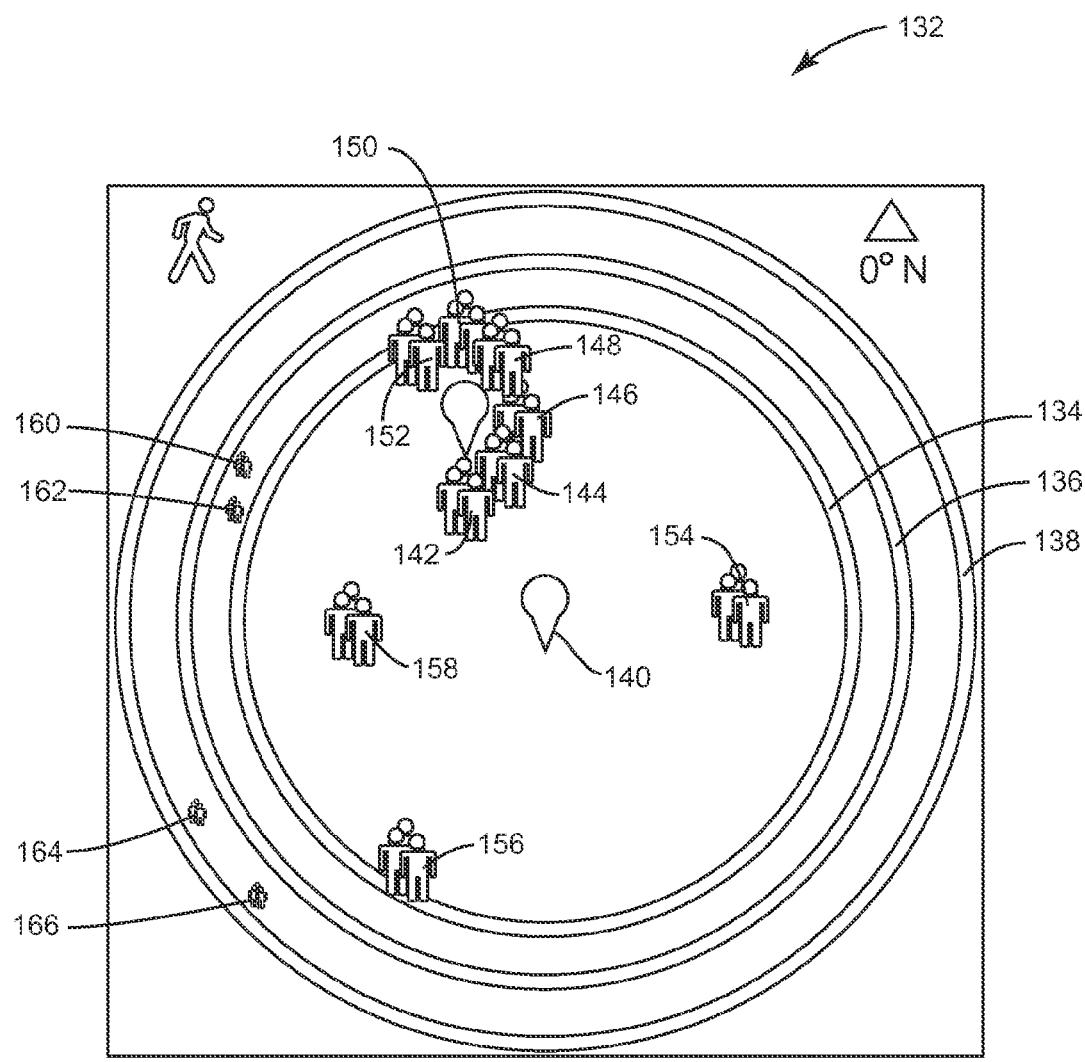
Figure 13B:
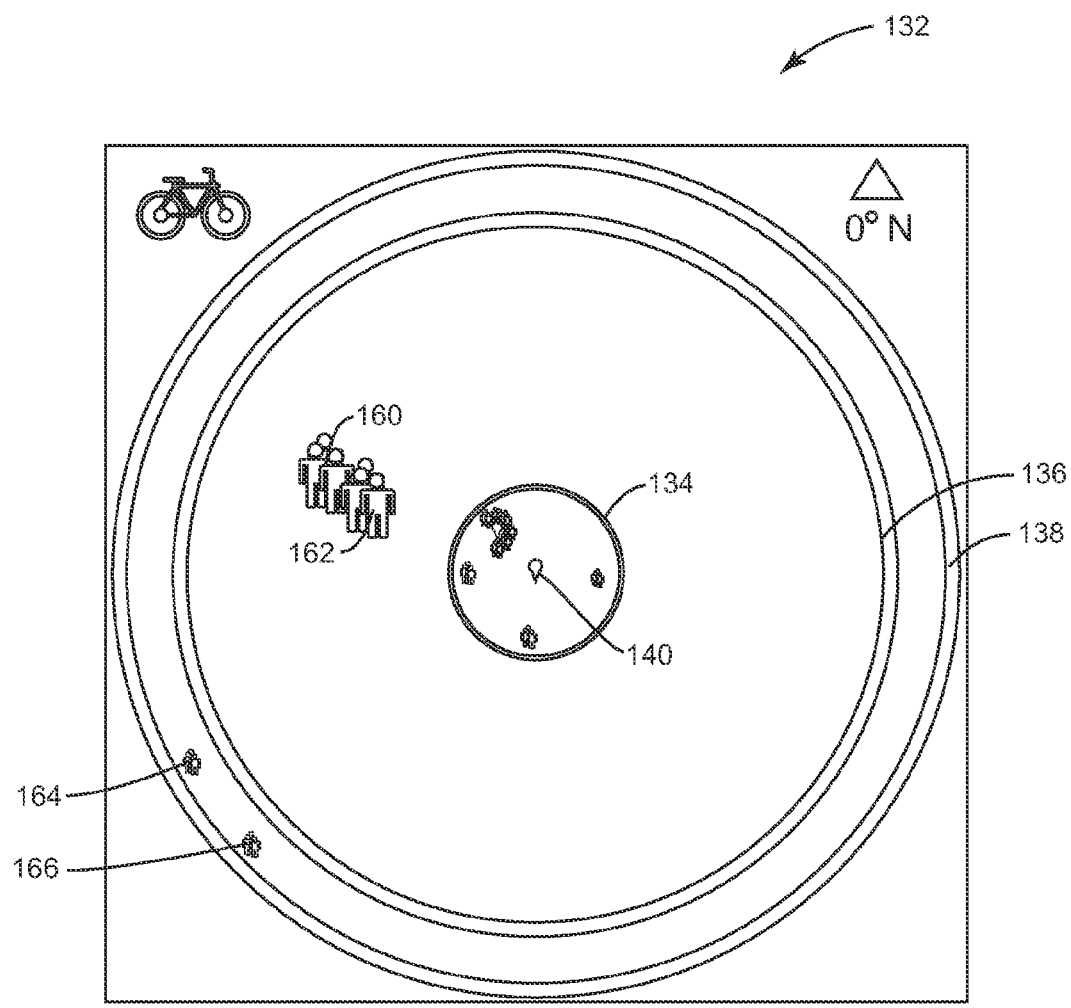
Figure 13C:
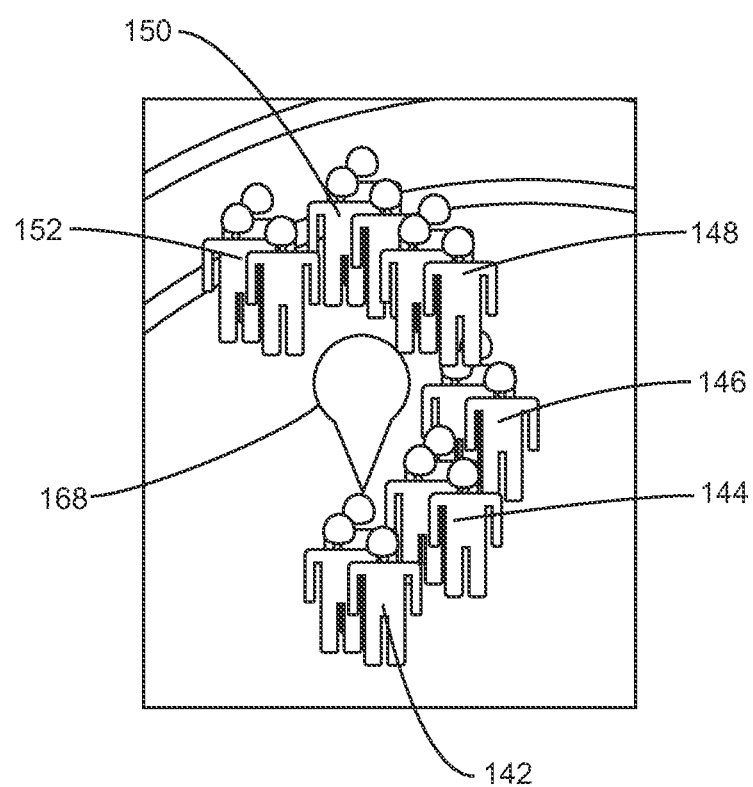
Figure 14:
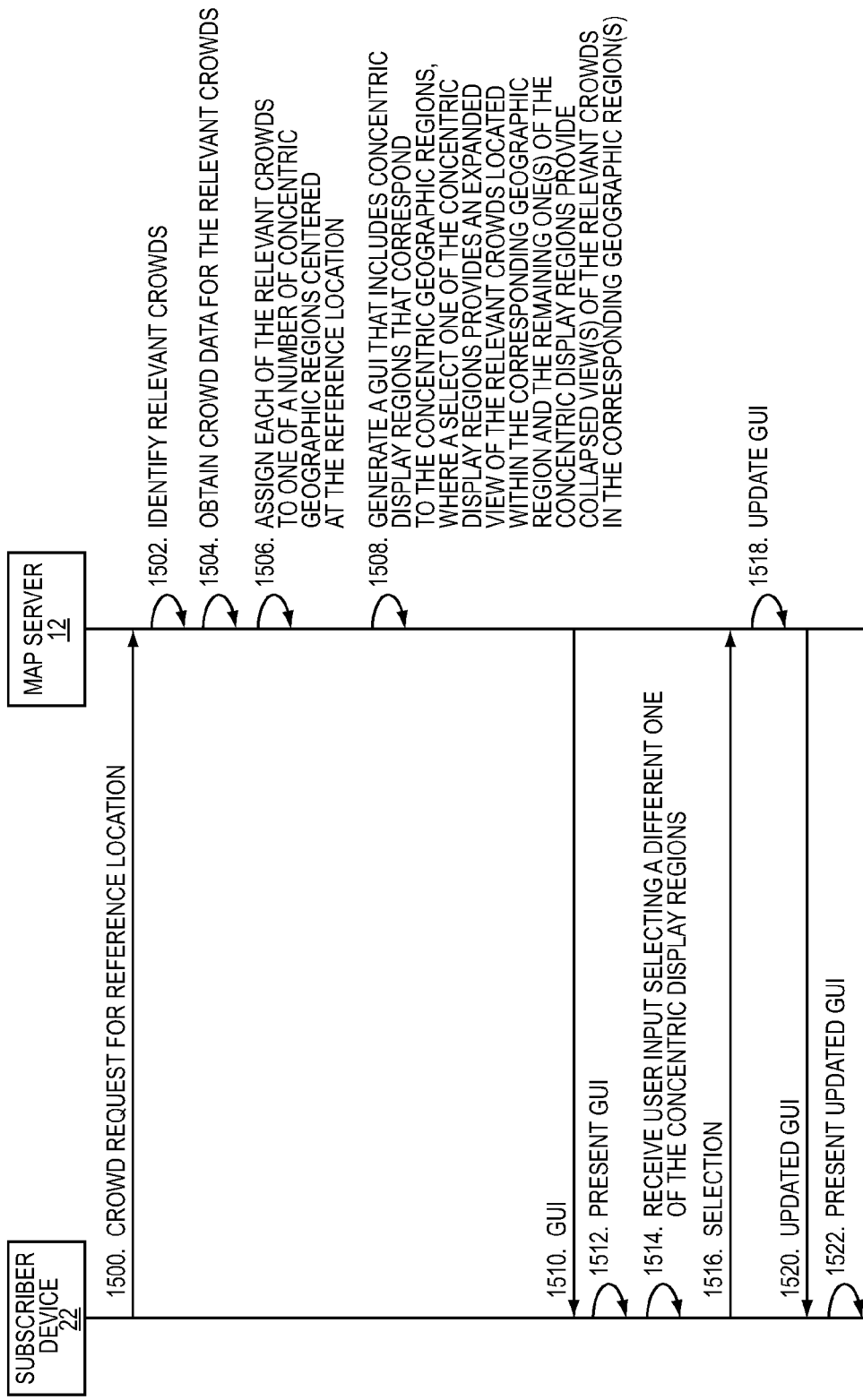
Figure 15:
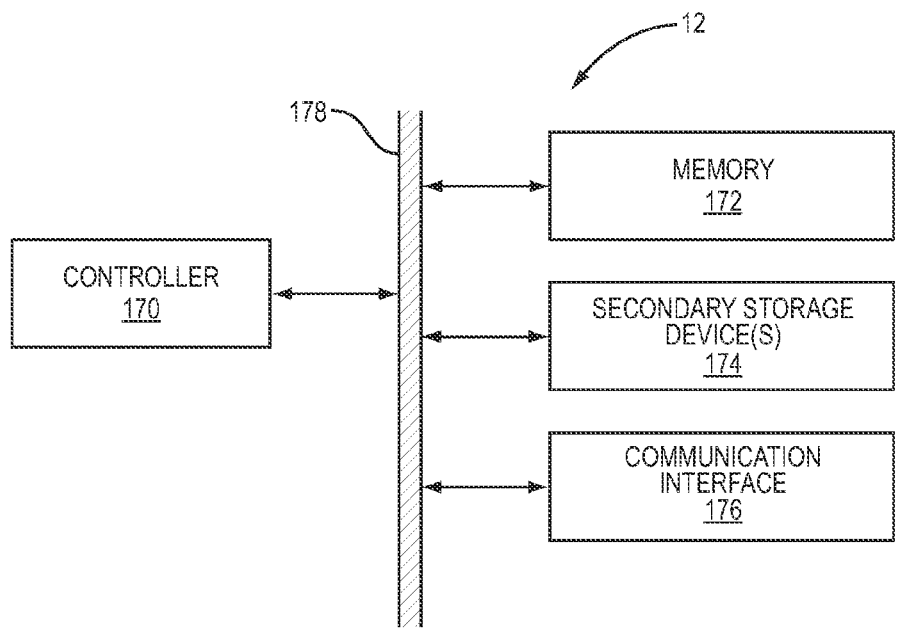
Figure 16:
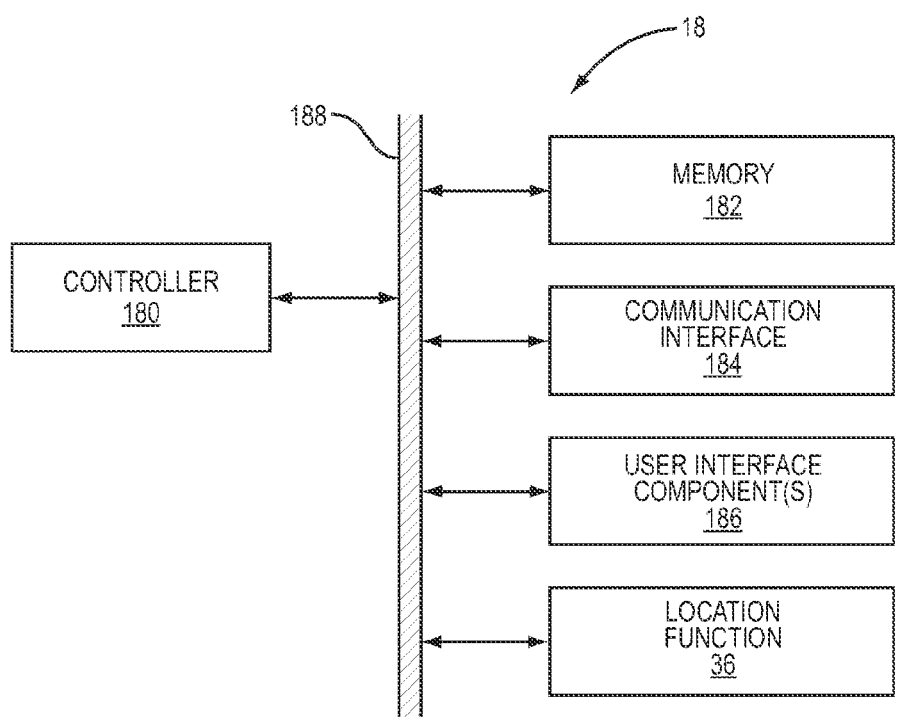
Figure 17:
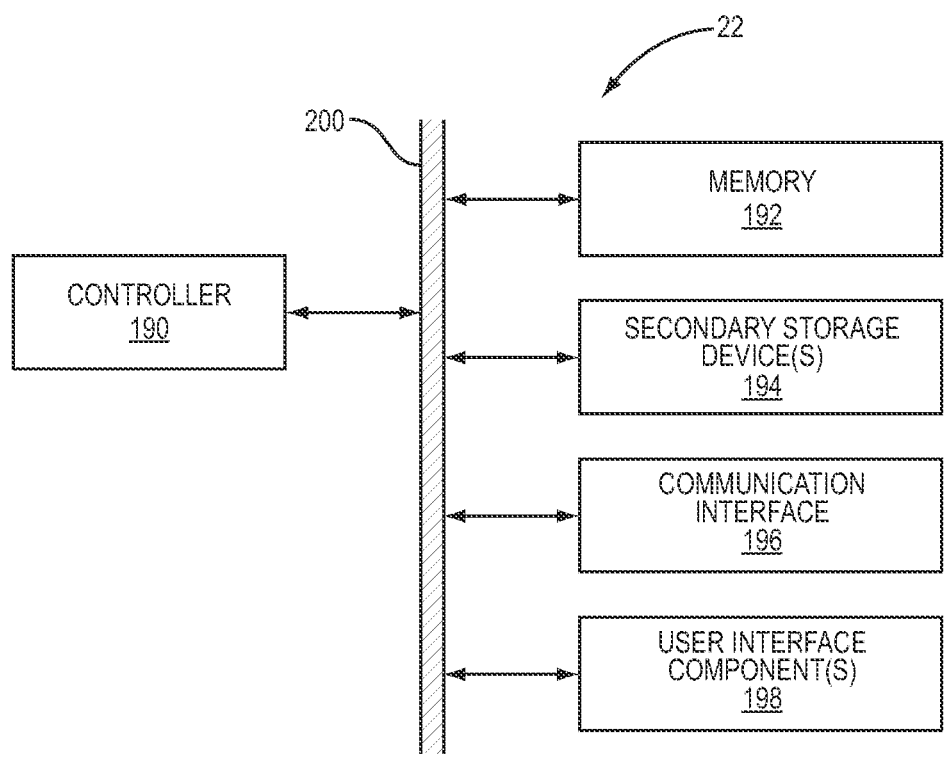
Figure 18:
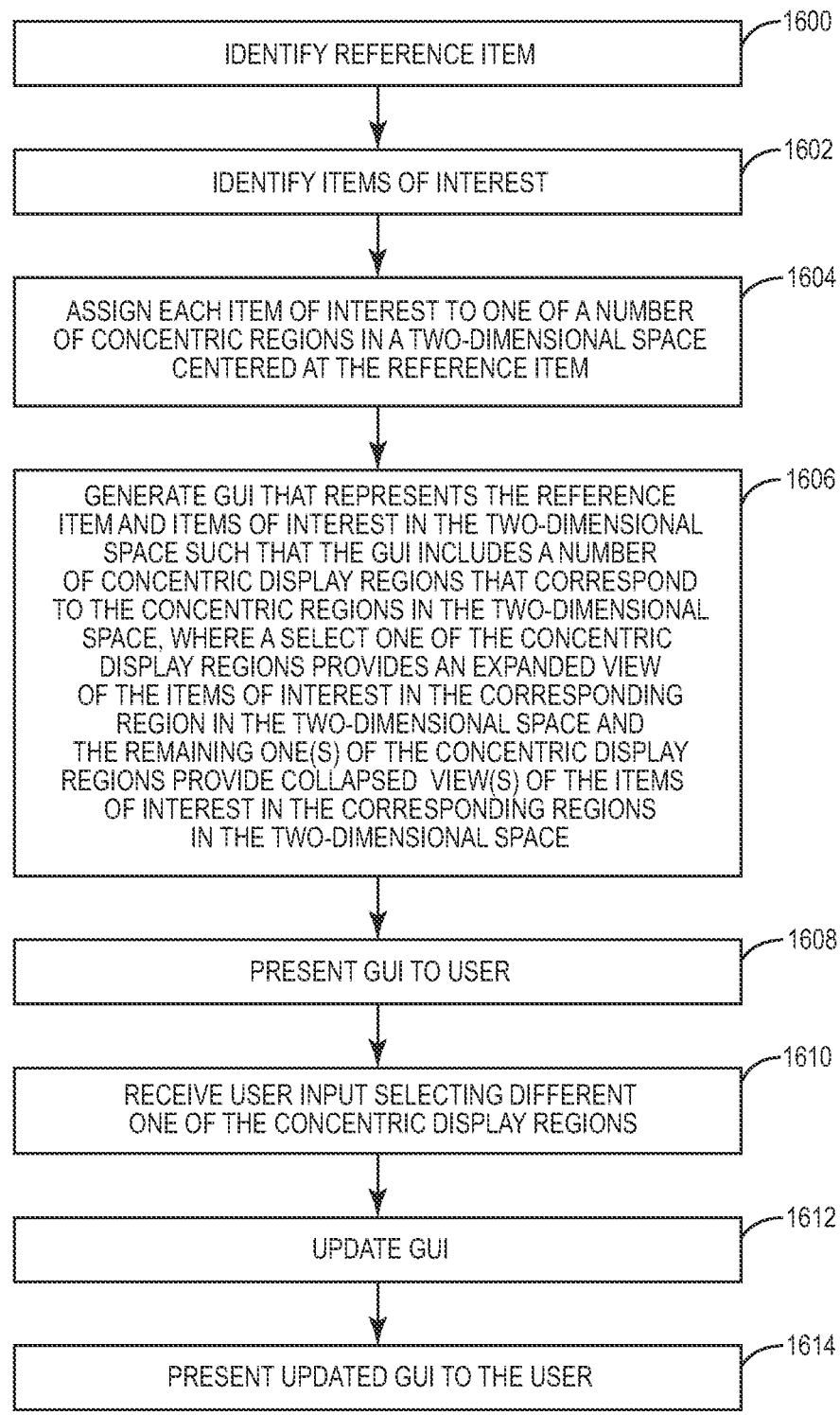

FIGS. 7A through 7D graphically illustrate the crowd formation process of FIG. 6 for an exemplary bounding box;

FIGS. 8A through 8D illustrate a flow chart for a spatial crowd formation process according to another embodiment of the present disclosure;

FIGS. 9A through 9D graphically illustrate the crowd formation process of FIGS. 8A through 8D for a scenario where the crowd formation process is triggered by a location update for a user having no old location;

FIGS. 10A through 10F graphically illustrate the crowd formation process of FIGS. 8A through 8D for a scenario where the new and old bounding boxes overlap;

FIGS. 11A through 11E graphically illustrate the crowd formation process of FIGS. 8A through 8D in a scenario where the new and old bounding boxes do not overlap;

FIG. 12 illustrates the operation of the system of FIG. 1 to provide a Graphical User Interface (GUI) that represents crowds near a reference location according to one embodiment of the present disclosure;

FIGS. 13A through 13C illustrate an exemplary embodiment of the GUI generated and presented in the process of FIG. 12;

FIG. 14 illustrates the operation of the system of FIG. 1 to provide a GUI that represents crowds near a reference location according to another embodiment of the present disclosure;

FIG. 15 is a block diagram of the MAP server of FIG. 1 according to one embodiment of the present disclosure;

FIG. 16 is a block diagram of one of the mobile devices of FIG. 1 according to one embodiment of the present disclosure;

FIG. 17 is a block diagram of the subscriber device of FIG. 1 according to one embodiment of the present disclosure; and FIG. 18 illustrates a more general process for generating and presenting a GUI that represents a reference item and a number of items of interest according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to a Graphical User Interface (GUI) for representing a reference item and a number of items of interest wherein placement of representations of the items of interest in the GUI is based on a comparison of one or more defined attributes of the reference item and the items of interest. FIGS. 1-11 describe an exemplary embodiment where the reference item is a reference geographic location (hereinafter "reference location") and the items of interest are crowds of users located at or near the reference location. However, as also described, below, the present disclosure is not limited to a reference location and crowds of users. The GUI described herein may be utilized to represent any type of reference item and items of interest that can be represented in two-dimensional space based on comparisons of one or more defined attributes of the reference item and the one or more items of interest.

Before describing the generation and presentation of a GUI that represents a reference location and nearby crowds of users, it is beneficial to describe a system for forming crowds of users. FIG. 1 illustrates a Mobile Aggregate Profile (MAP) system 10 (hereinafter "system 10") that operates to form crowds of users to enable generation and presentation of GUIs that represent reference locations and nearby crowds of users according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a third-party service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., Wi-Fi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations, including location updates, and user profiles of the users 20 of the mobile devices 18. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20, the MAP server 12 is enabled to provide a number of features such as, but not limited to, forming crowds of users using current locations and/or user profiles of the users 20 and generating aggregate profiles for crowds of users. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s Fire_Eagle® service.

The mobile devices 18 may be mobile smart phones, portable media player devices, mobile gaming devices, or the like. Some exemplary mobile devices that may be programmed or otherwise configured to operate as the mobile devices 18 are the Apple® iPhone®, the Palm Pre®, the Samsung Rogue™, the Blackberry Storm™, the Motorola Droid or similar phone running Google's Android™ Operating System, an Apple® iPad™, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate requests for crowd data from the MAP server 12 and present corresponding crowd data returned by the MAP server 12 to the user 20 as described below in detail. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of Points of Interest (POIs) or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be or include a Global Positioning System (GPS) receiver. In addition or alternatively, the location function 36 may include hardware and/or software that enables improved location tracking in indoor environments such as, for example, shopping malls. For example, the location function 36 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the third-party service 26 is a service that has access to data from the MAP server 12 such as aggregate profiles for one or more crowds at one or more POIs or within one or more AOIs. Based on the data from the MAP server 12, the third-party service 26 operates to provide a service such as, for example, targeted advertising. For example, the third-party service 26 may obtain anonymous aggregate profile data for one or more crowds located at a POI and then provide targeted advertising to known users located at the POI based on the anonymous aggregate profile data. Note that while targeted advertising is mentioned as an exemplary third-party service 26, other types of third-party services 26 may additionally or alternatively be provided. Other types of third-party services 26 that may be provided will be apparent to one of ordinary skill in the art upon reading this disclosure.

Before proceeding, it should be noted that while the system 10 of FIG. 1 illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

Figure 2:
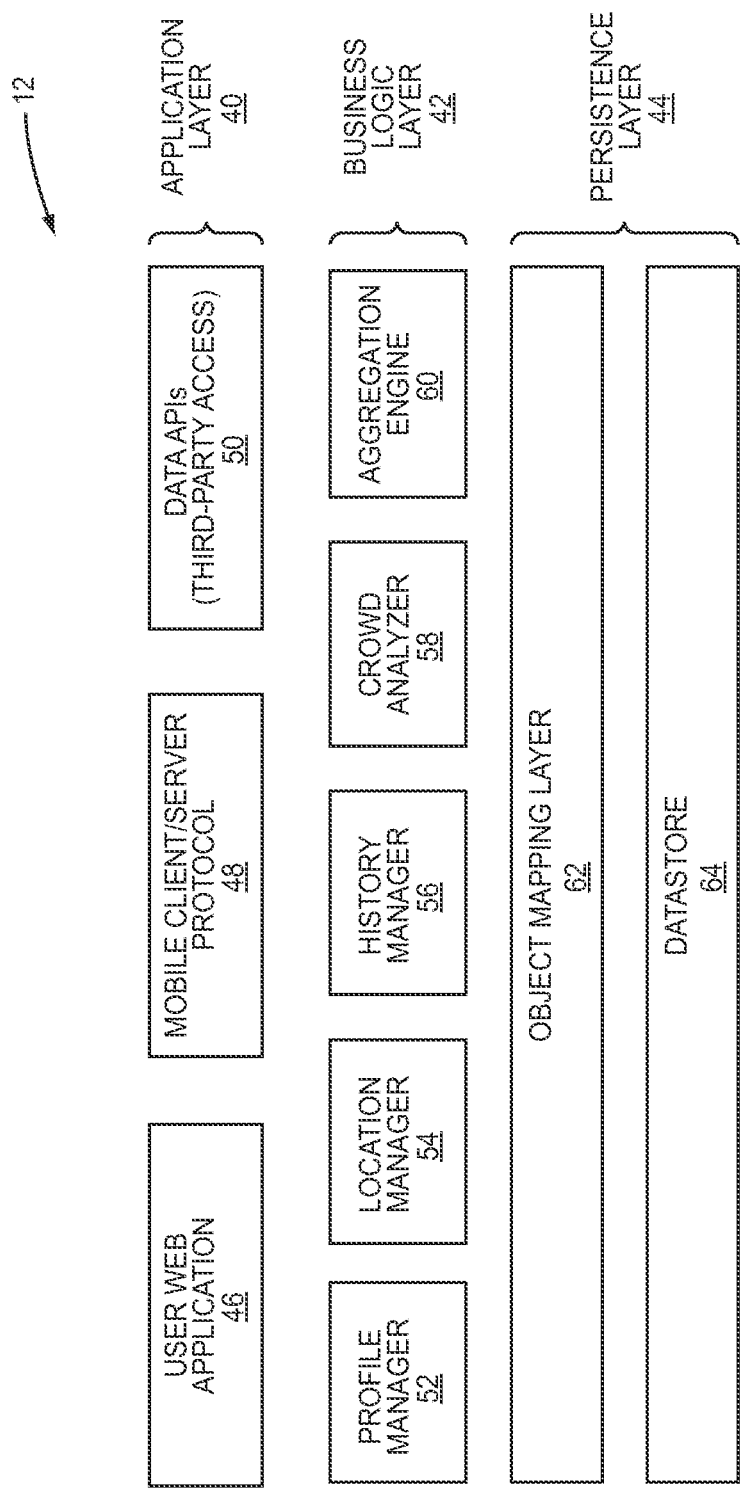
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the third-party service 26, to access the MAP server 12.

The business logic layer 42 includes a profile manager 52, a location manager 54, a history manager 56, a crowd analyzer 58, and an aggregation engine 60 each of which is preferably implemented in software. The profile manager 52 generally operates to obtain the user profiles of the users 20 directly or indirectly from the one or more profile servers 14 and store the user profiles in the persistence layer 44. The location manager 54 operates to obtain the current locations of the users 20 including location updates. As discussed below, the current locations of the users 20 may be obtained directly from the mobile devices 18 and/or obtained from the location server 16.

The history manager 56 generally operates to maintain a historical record of anonymized user profile data by location. Note that while the user profile data stored in the historical record is preferably anonymized, it is not limited thereto. The crowd analyzer 58 operates to form crowds of users. In one embodiment, the crowd analyzer 58 utilizes a spatial crowd formation algorithm. However, the present disclosure is not limited thereto. In addition, the crowd analyzer 58 may further characterize crowds to reflect degree of fragmentation, best-case and worst-case degree of separation (DOS), and/or degree of bi-directionality. Still further, the crowd analyzer 58 may also operate to track crowds. The aggregation engine 60 generally operates to provide aggregate profile data in response to requests from the mobile devices 18, the subscriber device 22, and the third-party service 26. The aggregate profile data may be historical aggregate profile data for one or more POIs or one or more AOIs or aggregate profile data for crowd(s) currently at one or more POIs or within one or more AOIs. For additional information regarding the operation of the profile manager 52, the location manager 54, the history manager 56, the crowd analyzer 58, and the aggregation engine 60, the interested reader is directed to U.S. Patent Publication number 2010/0198828, entitled FORMING CROWDS AND PROVIDING ACCESS TO CROWD DATA IN A MOBILE ENVIRONMENT, which was filed Dec. 23, 2009 and published Aug. 5, 2010; U.S. Patent Application Publication number 2010/0197318, entitled ANONYMOUS CROWD TRACKING, which was filed Dec. 23, 2009 and published Aug. 5, 2010; U.S. Patent Application Publication number 2010/0198826, entitled MAINTAINING A HISTORICAL RECORD OF ANONYMIZED USER PROFILE DATA BY LOCATION FOR USERS IN A MOBILE ENVIRONMENT, which was filed Dec. 23, 2009 and published Aug. 5, 2010; U.S. Patent Application Publication number 2010/0198917, entitled CROWD FORMATION FOR MOBILE DEVICE USERS, which was filed Dec. 23, 2009 and published Aug. 5, 2010; U.S. Patent Application Publication number 2010/0198870, entitled SERVING A REQUEST FOR DATA FROM A HISTORICAL RECORD OF ANONYMIZED USER PROFILE DATA IN A MOBILE ENVIRONMENT, which was filed Dec. 23, 2009 and published Aug. 5, 2010; U.S. Patent Application Publication number 2010/0198862, entitled HANDLING CROWD REQUESTS FOR LARGE GEOGRAPHIC AREAS, which was filed Dec. 23, 2009 and published Aug. 5, 2010; and U.S. Patent Application Publication number 2010/0197319, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009 and published Aug. 5, 2010; all of which are hereby incorporated herein by reference in their entireties.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
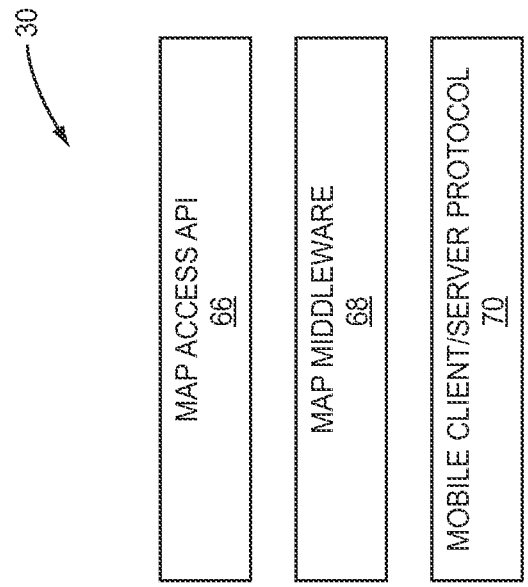
FIG. 3 is a block diagram of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP client 30 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
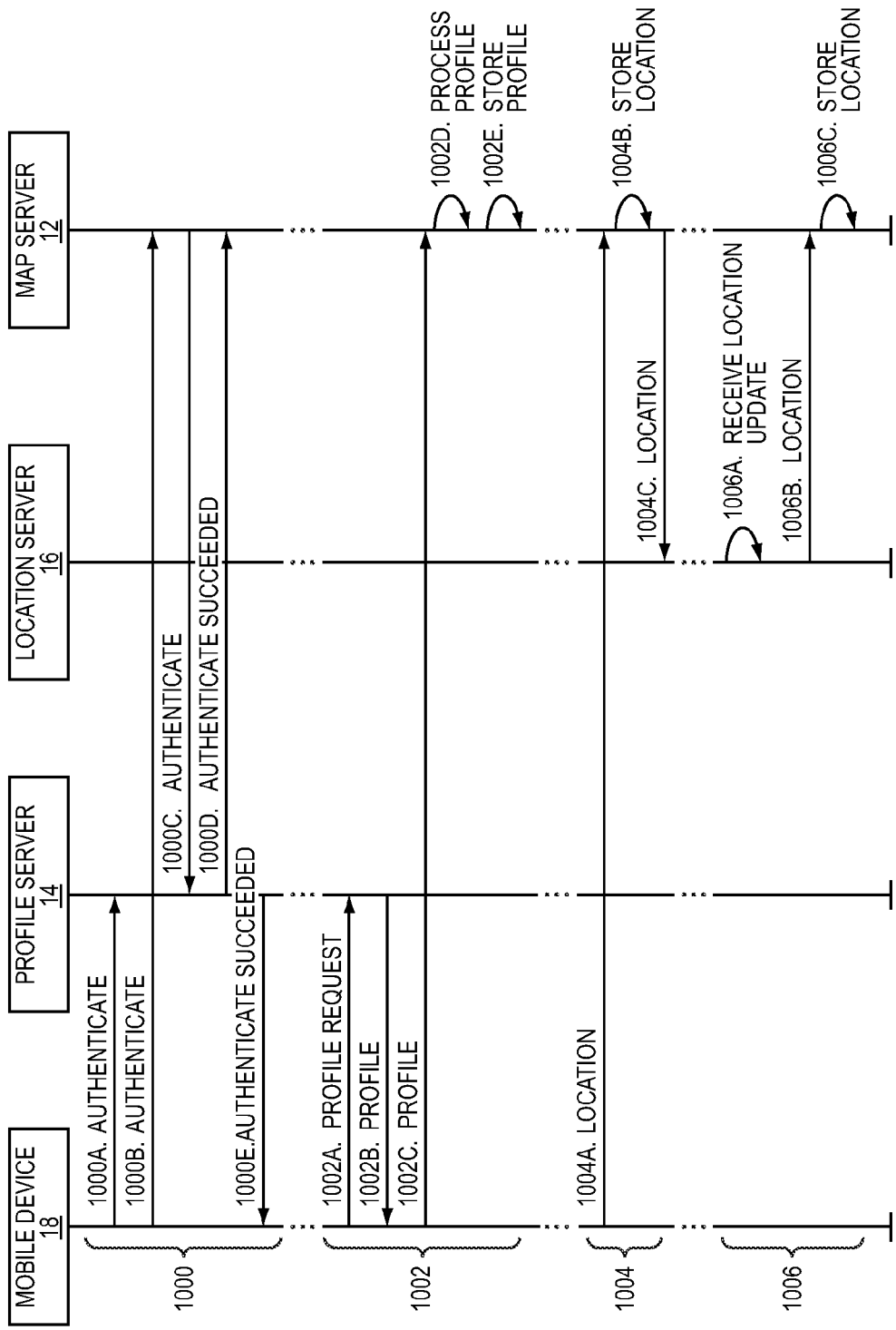
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12 that operate to map the user profiles of the users 20 obtained from the social network services to a common format utilized by the MAP server 12. This common format includes a number of user profile categories, or user profile slices, such as, for example, a demographic profile category, a social interaction profile category, a general interests category, a music interests profile category, and a movie interests profile category. For example, if the MAP server 12 supports user profiles from Facebook®, MySpace®, and LinkedIN®, the profile manager 52 may include a Facebook handler, a MySpace handler, and a LinkedIN handler. The social network handlers process user profiles from the corresponding social network services to generate user profiles for the users 20 in the common format used by the MAP server 12. For this example assume that the user profile of the user 20 is from Facebook®. The profile manager 52 uses a Facebook handler to process the user profile of the user 20 to map the user profile of the user 20 from Facebook® to a user profile for the user 20 for the MAP server 12 that includes lists of keywords for a number of predefined profile categories, or profile slices, such as, for example, a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. Any historical data maintained by the MAP server 12 is preferably anonymized by the history manager 56 in order to maintain the privacy of the users 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
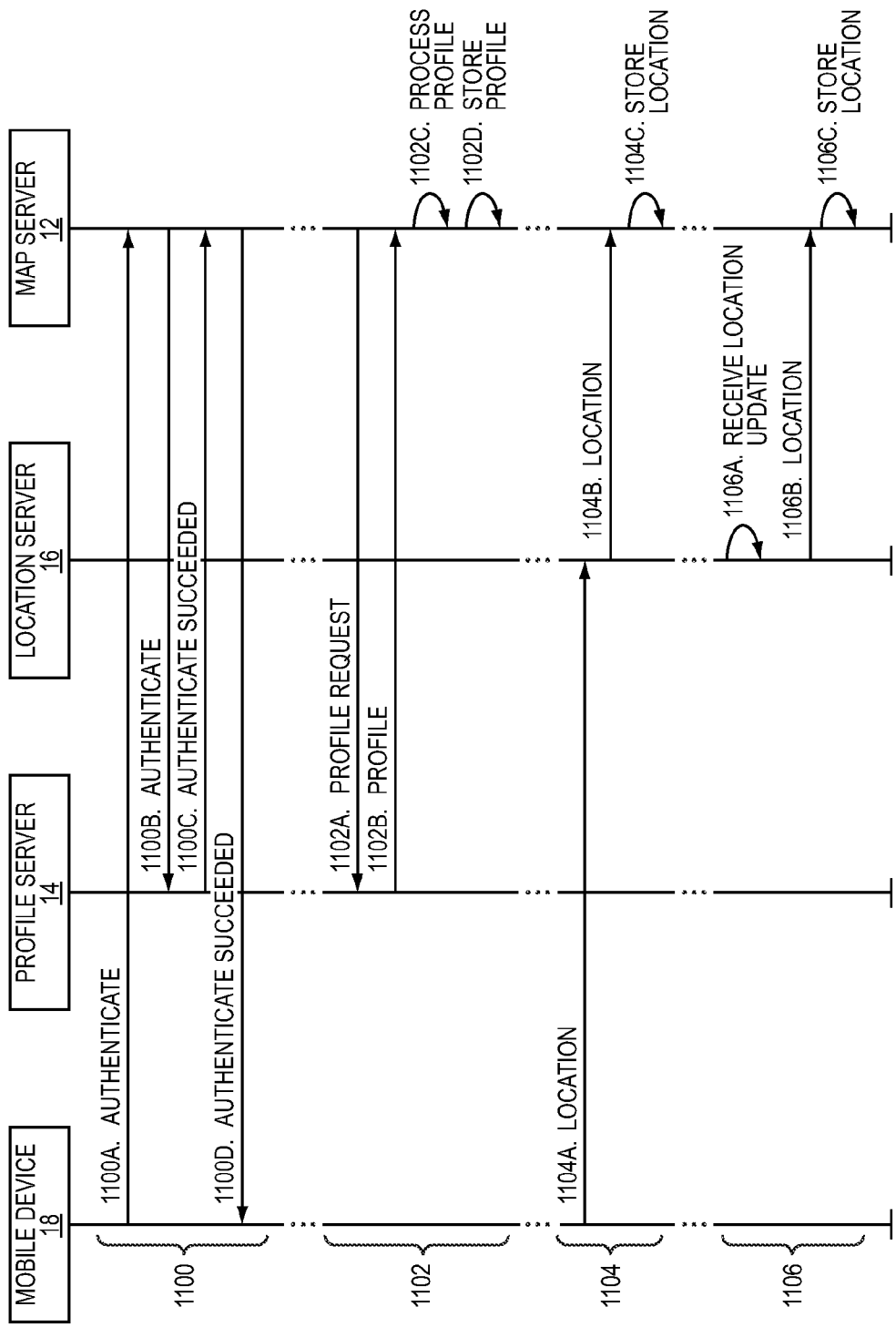
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories, or profile slices.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

FIG. 6 begins a discussion of the operation of the crowd analyzer 58 to form crowds of users according to one embodiment of the present disclosure. Specifically, FIG. 6 is a flow chart for a spatial crowd formation process according to one embodiment of the present disclosure. Note that, in one embodiment, this process is performed in response to a request for crowd data for a POI or an AOI or in response to a crowd search request. In another embodiment, this process may be performed proactively by the crowd analyzer 58 as, for example, a background process.

First, the crowd analyzer 58 establishes a bounding box for the crowd formation process (step 1200). Note that while a bounding box is used in this example, other geographic shapes may be used to define a bounding region for the crowd formation process (e.g., a bounding circle). In one embodiment, if crowd formation is performed in response to a specific request, the bounding box is established based on the POI or the AOI of the request. If the request is for a POI, then the bounding box is a geographic area of a predetermined size centered at the POI. If the request is for an AOI, the bounding box is the AOI. Alternatively, if the crowd formation process is performed proactively, the bounding box is a bounding box of a predefined size.

The crowd analyzer 58 then creates a crowd for each individual user in the bounding box (step 1202). More specifically, the crowd analyzer 58 queries the datastore 64 of the MAP server 12 to identify users currently located within the bounding box. Then, a crowd of one user is created for each user currently located within the bounding box. Next, the crowd analyzer 58 determines the two closest crowds in the bounding box (step 1204) and determines a distance between the two crowds (step 1206). The distance between the two crowds is a distance between crowd centers of the two crowds. Note that the crowd center of a crowd of one is the current location of the user in the crowd. The crowd analyzer 58 then determines whether the distance between the two crowds is less than an optimal inclusion distance (step 1208). In this embodiment, the optimal inclusion distance is a predefined static distance. If the distance between the two crowds is less than the optimal inclusion distance, the crowd analyzer 58 combines the two crowds (step 1210) and computes a new crowd center for the resulting crowd (step 1212). The crowd center may be computed based on the current locations of the users in the crowd using a center of mass algorithm. At this point the process returns to step 1204 and is repeated until the distance between the two closest crowds is not less than the optimal inclusion distance. At that point, the crowd analyzer 58 discards any crowds with less than three users (step 1214). Note that throughout this disclosure crowds are only maintained if the crowds include three or more users. However, while three users is the preferred minimum number of users in a crowd, the present disclosure is not limited thereto. The minimum number of users in a crowd may be defined as any number greater than or equal to two users.

Figure 7A:
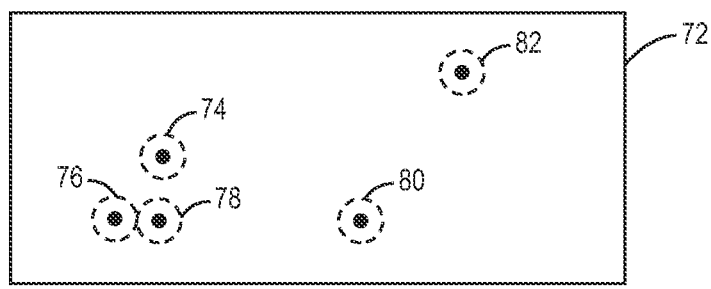
Figure 7B:
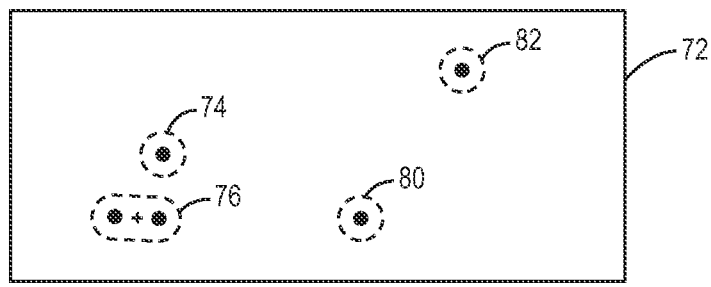
Figure 7C:
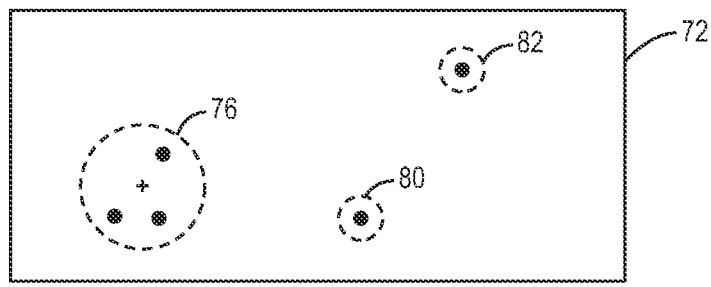
Figure 7D:
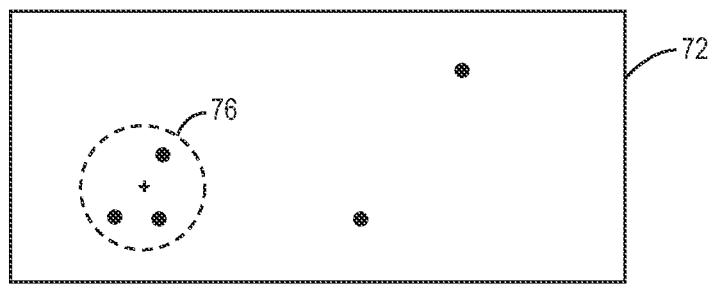

FIGS. 7A through 7D graphically illustrate the crowd formation process of FIG. 6 for an exemplary bounding box 72. In FIGS. 7A through 7D, crowds are noted by dashed circles, and the crowd centers are noted by cross-hairs (+). As illustrated in FIG. 7A, initially, the crowd analyzer 58 creates crowds 74 through 82 for the users in the geographic area defined by the bounding box 72, where, at this point, each of the crowds 74 through 82 includes one user. The current locations of the users are the crowd centers of the crowds 74 through 82. Next, the crowd analyzer 58 determines the two closest crowds and a distance between the two closest crowds. In this example, at this point, the two closest crowds are crowds 76 and 78, and the distance between the two closest crowds 76 and 78 is less than the optimal inclusion distance. As such, the two closest crowds 76 and 78 are combined by merging crowd 78 into crowd 76, and a new crowd center (+) is computed for the crowd 76, as illustrated in FIG. 7B. Next, the crowd analyzer 58 again determines the two closest crowds, which are now crowds 74 and 76. The crowd analyzer 58 then determines a distance between the crowds 74 and 76. Since the distance is less than the optimal inclusion distance, the crowd analyzer 58 combines the two crowds 74 and 76 by merging the crowd 74 into the crowd 76, and a new crowd center (+) is computed for the crowd 76, as illustrated in FIG. 7C. At this point, there are no more crowds separated by less than the optimal inclusion distance. As such, the crowd analyzer 58 discards crowds having less than three users, which in this example are crowds 80 and 82. As a result, at the end of the crowd formation process, the crowd 76 has been formed with three users, as illustrated in FIG. 7D.

FIGS. 8A through 8D illustrate a flow chart for a spatial crowd formation process according to another embodiment of the present disclosure. In this embodiment, the spatial crowd formation process is triggered in response to receiving a location update for one of the users 20 and is preferably repeated for each location update received for the users 20. As such, first, the crowd analyzer 58 receives a location update, or a new location, for a user (step 1300). Assume that, for this example, the location update is received for the user 20-1. In response, the crowd analyzer 58 retrieves an old location of the user 20-1, if any (step 1302). The old location is the current location of the user 20-1 prior to receiving the new location. The crowd analyzer 58 then creates a new bounding box of a predetermined size centered at the new location of the user 20-1 (step 1304) and an old bounding box of a predetermined size centered at the old location of the user 20-1, if any (step 1306). The predetermined size of the new and old bounding boxes may be any desired size. As one example, the predetermined size of the new and old bounding boxes is 40 meters by 40 meters. Note that if the user 20-1 does not have an old location (i.e., the location received in step 1300 is the first location received for the user 20-1), then the old bounding box is essentially null. Also note that while bounding "boxes" are used in this example, the bounding areas may be of any desired shape.

Next, the crowd analyzer 58 determines whether the new and old bounding boxes overlap (step 1308). If so, the crowd analyzer 58 creates a bounding box encompassing the new and old bounding boxes (step 1310). For example, if the new and old bounding boxes are 40×40 meter regions and a 1×1 meter square at the northeast corner of the new bounding box overlaps a 1×1 meter square at the southwest corner of the old bounding box, the crowd analyzer 58 may create a 79×79 meter square bounding box encompassing both the new and old bounding boxes.

The crowd analyzer 58 then determines the individual users and crowds relevant to the bounding box created in step 1310 (step 1312). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 58 computes an optimal inclusion distance for individual users based on user density within the bounding box (step 1314). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{number\_of\_users}}, \quad \text{Eqn. (1)}$$

where $a$ is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, $a$ is ⅔.

The crowd analyzer 58 then creates a crowd for each individual user within the bounding box that is not already included in a crowd and sets the optimal inclusion distance for the crowds to the initial optimal inclusion distance (step 1316). At this point, the process proceeds to FIG. 8B where the crowd analyzer 58 analyzes the crowds relevant to the bounding box to determine whether any of the crowd members (i.e., users in the crowds) violate the optimal inclusion distance of their crowds (step 1318). Any crowd member that violates the optimal inclusion distance of his or her crowd is then removed from that crowd (step 1320). The crowd analyzer 58 then creates a crowd of one user for each of the users removed from their crowds in step 1320 and sets the optimal inclusion distance for the newly created crowds to the initial optimal inclusion distance (step 1322).

Next, the crowd analyzer 58 determines the two closest crowds for the bounding box (step 1324) and a distance between the two closest crowds (step 1326). The distance between the two closest crowds is the distance between the crowd centers of the two closest crowds. The crowd analyzer 58 then determines whether the distance between the two closest crowds is less than the optimal inclusion distance of a larger of the two closest crowds (step 1328). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is not less than the optimal inclusion distance, then the process proceeds to step 1338. Otherwise, the two closest crowds are combined or merged (step 1330), and a new crowd center for the resulting crowd is computed (step 1332). Again, a center of mass algorithm may be used to compute the crowd center of a crowd. In addition, a new optimal inclusion distance for the resulting crowd is computed (step 1334). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (2)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (3)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 1336). The maximum number of iterations is a predefined number that ensures that the crowd formation process does not indefinitely loop over steps 1318 through 1334 or loop over steps 1318 through 1334 more than a desired maximum number of times. If the maximum number of iterations has not been reached, the process returns to step 1318 and is repeated until either the distance between the two closest crowds is not less than the optimal inclusion distance of the larger crowd or the maximum number of iterations has been reached. At that point, the crowd analyzer 58 discards crowds with less than three users, or members (step 1338) and the process ends.

Figure 8A:
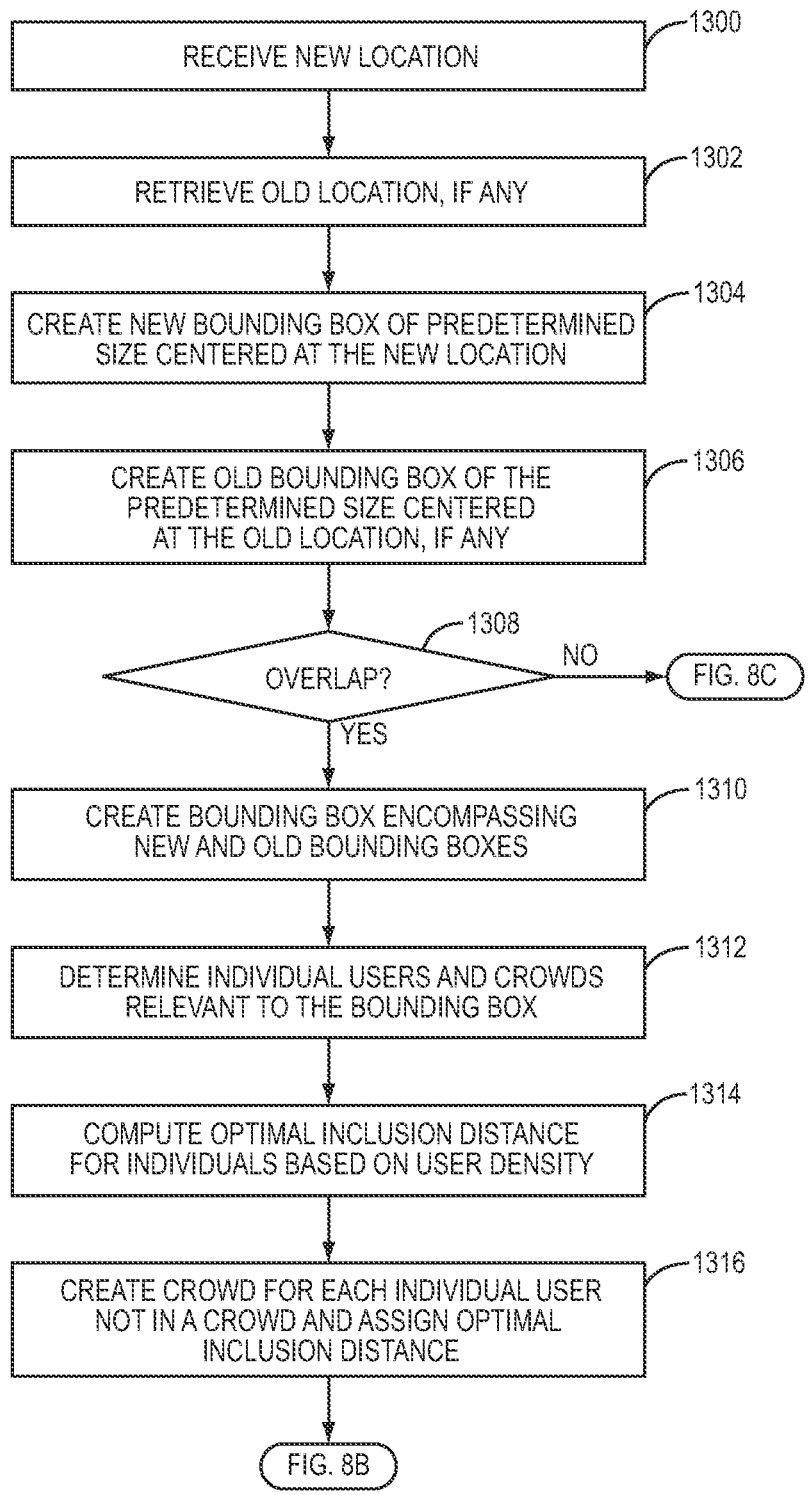
Figure 8B:
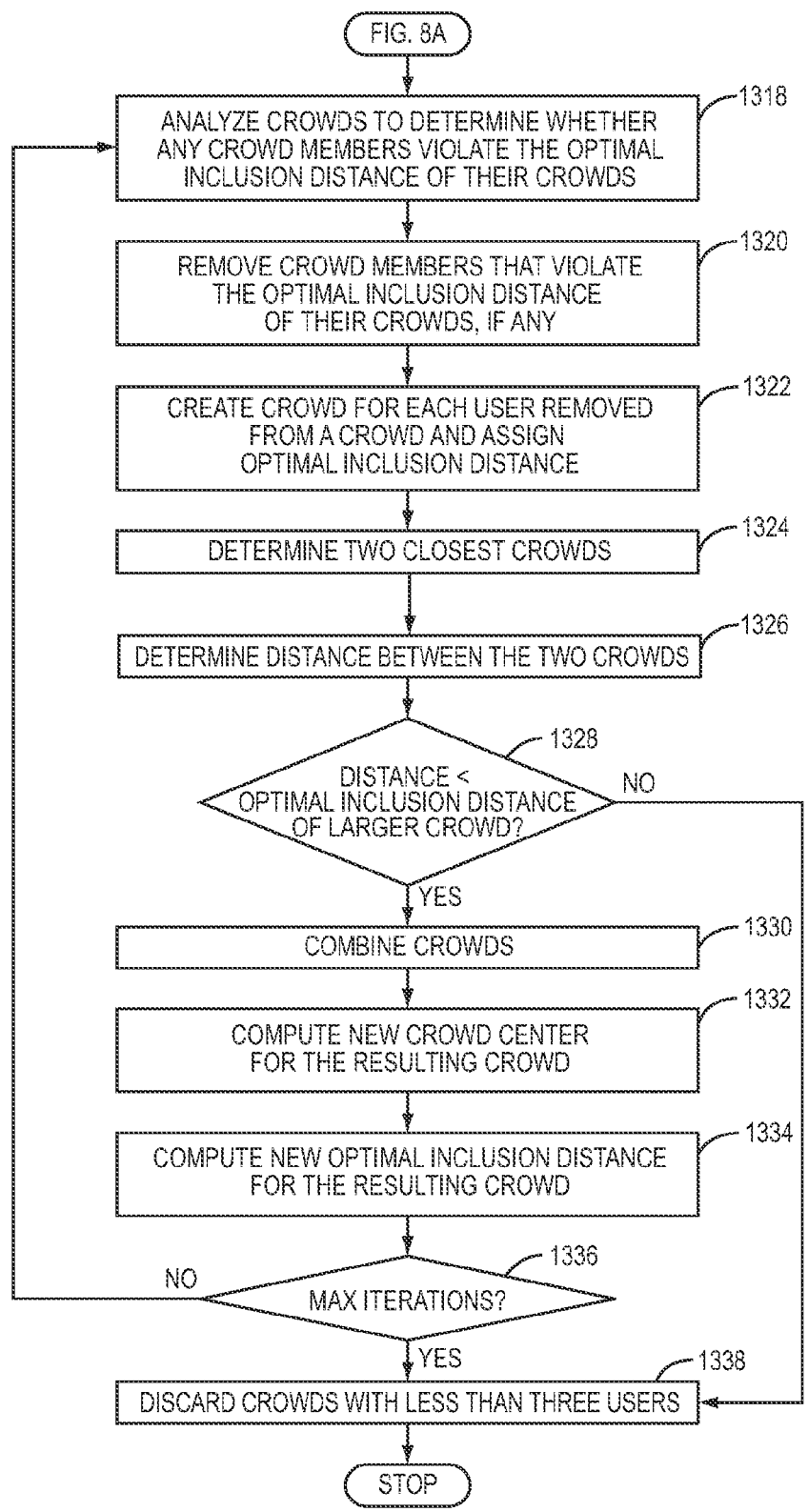
Figure 8C:
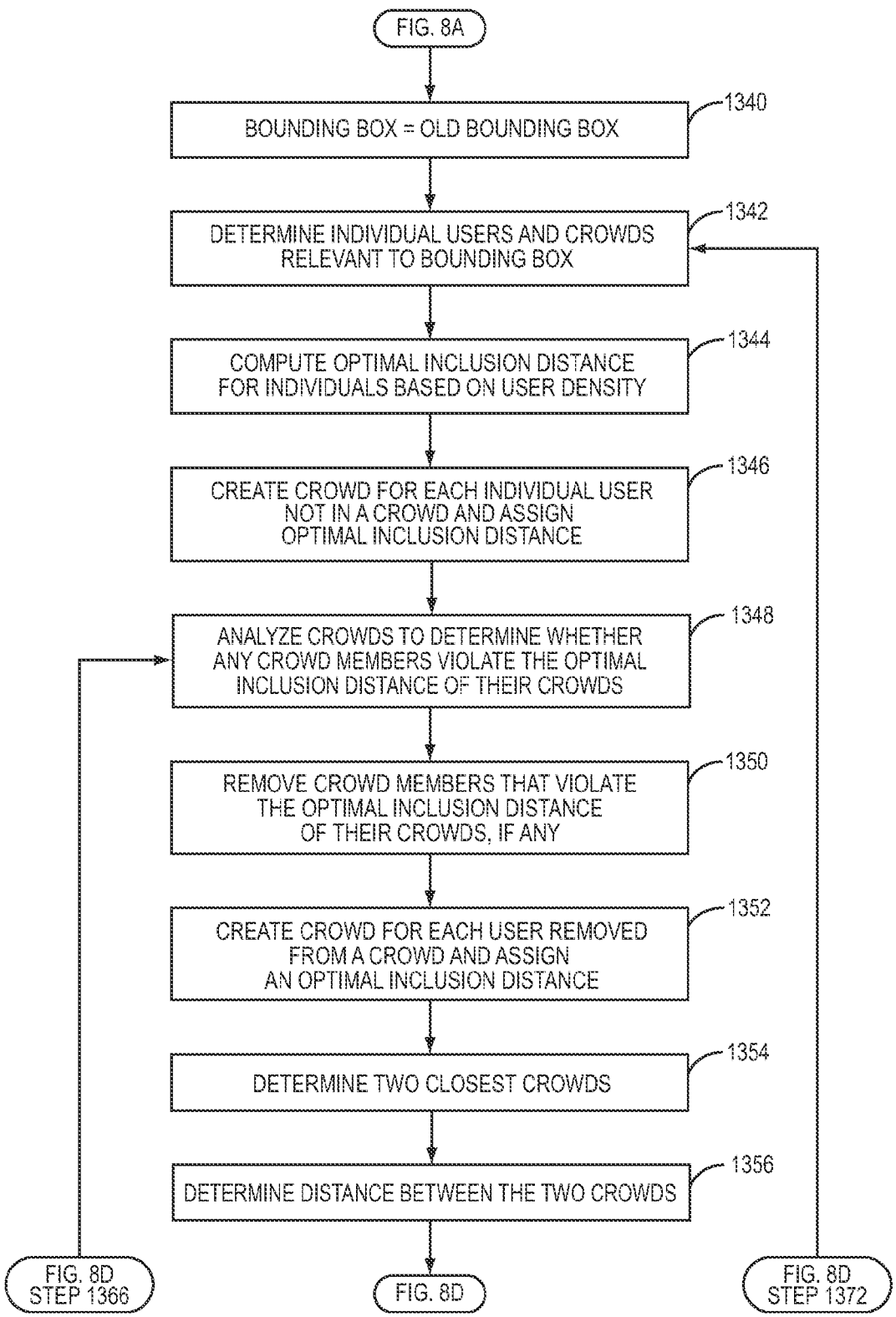
Figure 8D:
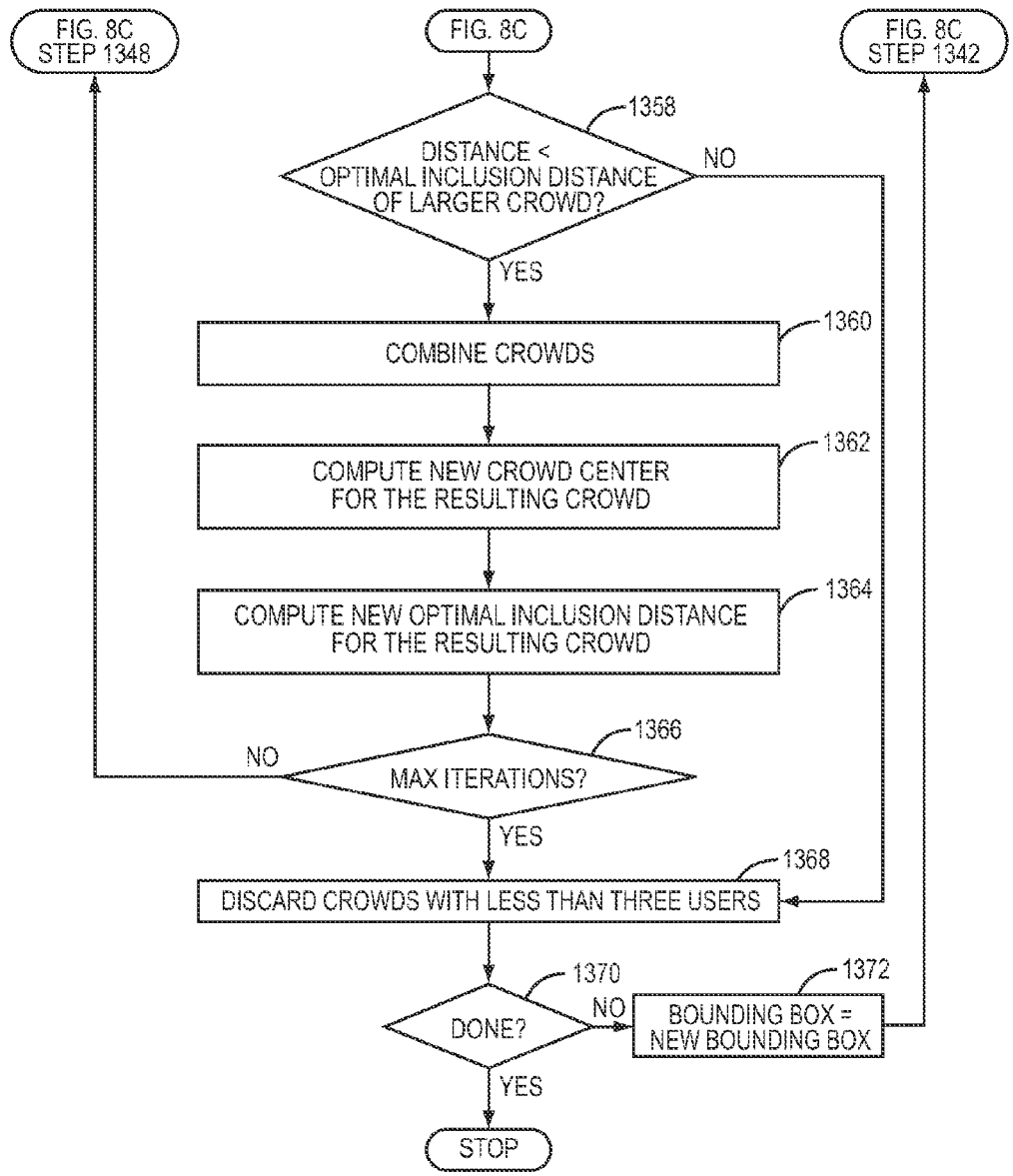

Returning to step 1308 in FIG. 8A, if the new and old bounding boxes do not overlap, the process proceeds to FIG. 8C and the bounding box to be processed is set to the old bounding box (step 1340). In general, the crowd analyzer 58 then processes the old bounding box in much the same manner as described above with respect to steps 1312 through 1338. More specifically, the crowd analyzer 58 determines the individual users and crowds relevant to the bounding box (step 1342). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 58 computes an optimal inclusion distance for individual users based on user density within the bounding box (step 1344). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (4)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 58 then creates a crowd of one user for each individual user within the bounding box that is not already included in a crowd and sets the optimal inclusion distance for the crowds to the initial optimal inclusion distance (step 1346). At this point, the crowd analyzer 58 analyzes the crowds for the bounding box to determine whether any crowd members (i.e., users in the crowds) violate the optimal inclusion distance of their crowds (step 1348). Any crowd member that violates the optimal inclusion distance of his or her crowd is then removed from that crowd (step 1350). The crowd analyzer 58 then creates a crowd of one user for each of the users removed from their crowds in step 1350 and sets the optimal inclusion distance for the newly created crowds to the initial optimal inclusion distance (step 1352).

Next, the crowd analyzer 58 determines the two closest crowds in the bounding box (step 1354) and a distance between the two closest crowds (step 1356). The distance between the two closest crowds is the distance between the crowd centers of the two closest crowds. The crowd analyzer 58 then determines whether the distance between the two closest crowds is less than the optimal inclusion distance of a larger of the two closest crowds (step 1358). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is not less than the optimal inclusion distance, the process proceeds to step 1368. Otherwise, the two closest crowds are combined or merged (step 1360), and a new crowd center for the resulting crowd is computed (step 1362). Again, a center of mass algorithm may be used to compute the crowd center of a crowd. In addition, a new optimal inclusion distance for the resulting crowd is computed (step 1364). As discussed above, in one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (5)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (6)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 1366). If the maximum number of iterations has not been reached, the process returns to step 1348 and is repeated until either the distance between the two closest crowds is not less than the optimal inclusion distance of the larger crowd or the maximum number of iterations has been reached. At that point, the crowd analyzer 58 discards crowds with less than three users, or members (step 1368). The crowd analyzer 58 then determines whether the crowd formation process for the new and old bounding boxes is done (step 1370). In other words, the crowd analyzer 58 determines whether both the new and old bounding boxes have been processed. If not, the bounding box is set to the new bounding box (step 1372), and the process returns to step 1342 and is repeated for the new bounding box. Once both the new and old bounding boxes have been processed, the crowd formation process ends.

Figure 9A:
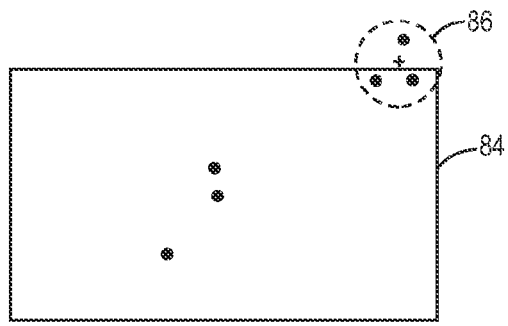
Figure 9B:
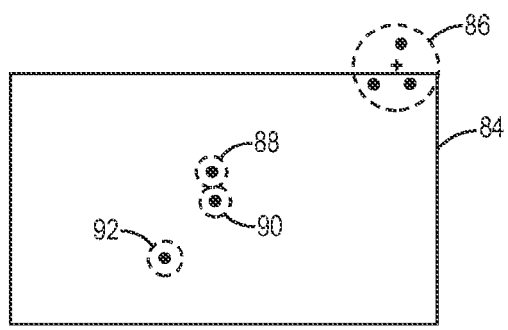

FIGS. 9A through 9D graphically illustrate the crowd formation process of FIGS. 8A through 8D for a scenario where the crowd formation process is triggered by a location update for a user having no old location. In this scenario, the crowd analyzer 58 creates a new bounding box 84 for the new location of the user, and the new bounding box 84 is set as the bounding box to be processed for crowd formation. Then, as illustrated in FIG. 9A, the crowd analyzer 58 identifies all individual users currently located within the new bounding box 84 and all crowds located within or overlapping the new bounding box 84. In this example, crowd 86 is an existing crowd relevant to the new bounding box 84. Crowds are indicated by dashed circles, crowd centers are indicated by cross-hairs (+), and users are indicated as dots. Next, as illustrated in FIG. 9B, the crowd analyzer 58 creates crowds 88 through 92 of one user for the individual users, and the optimal inclusion distances of the crowds 88 through 92 are set to the initial optimal inclusion distance. As discussed above, the initial optimal inclusion distance is computed by the crowd analyzer 58 based on a density of users within the new bounding box 84.

Figure 9C:
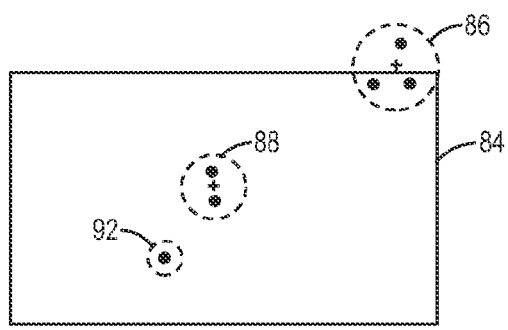
Figure 9D:
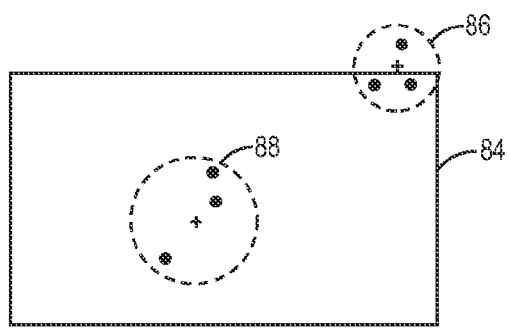

The crowd analyzer 58 then identifies the two closest crowds 88 and 90 in the new bounding box 84 and determines a distance between the two closest crowds 88 and 90. In this example, the distance between the two closest crowds 88 and 90 is less than the optimal inclusion distance. As such, the two closest crowds 88 and 90 are merged and a new crowd center and new optimal inclusion distance are computed, as illustrated in FIG. 9C. The crowd analyzer 58 then repeats the process such that the two closest crowds 88 and 92 in the new bounding box 84 are again merged, as illustrated in FIG. 9D. At this point, the distance between the two closest crowds 86 and 88 is greater than the appropriate optimal inclusion distance. As such, the crowd formation process is complete.

Figure 10A:
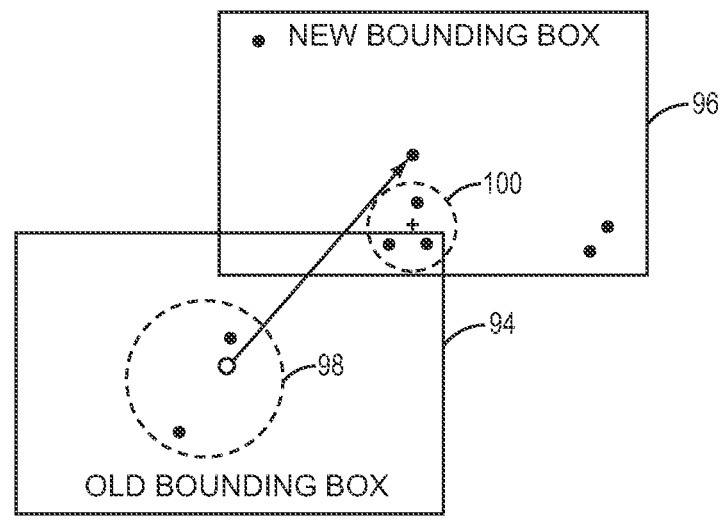

FIGS. 10A through 10F graphically illustrate the crowd formation process of FIGS. 8A through 8D for a scenario where the new and old bounding boxes overlap. As illustrated in FIG. 10A, a user moves from an old location to a new location, as indicated by an arrow. The crowd analyzer 58 receives a location update for the user giving the new location of the user. In response, the crowd analyzer 58 creates an old bounding box 94 for the old location of the user and a new bounding box 96 for the new location of the user. Crowd 98 exists in the old bounding box 94, and crowd 100 exists in the new bounding box 96.

Figure 10B:
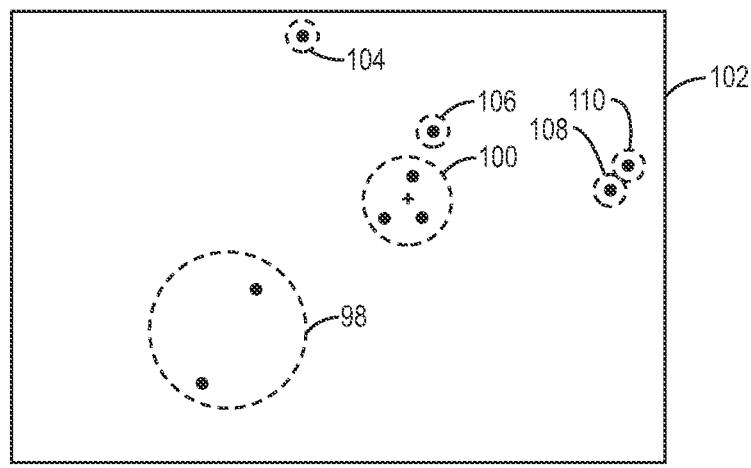

Since the old bounding box 94 and the new bounding box 96 overlap, the crowd analyzer 58 creates a bounding box 102 that encompasses both the old bounding box 94 and the new bounding box 96, as illustrated in FIG. 10B. In addition, the crowd analyzer 58 creates crowds 104 through 110 for individual users currently located within the bounding box 102. The optimal inclusion distances of the crowds 104 through 110 are set to the initial optimal inclusion distance computed by the crowd analyzer 58 based on the density of users in the bounding box 102.

Figure 10C:
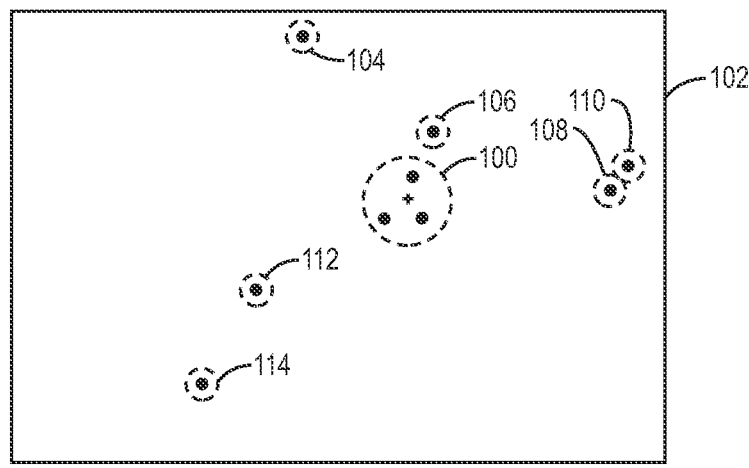

Next, the crowd analyzer 58 analyzes the crowds 98, 100, and 104 through 110 to determine whether any members of the crowds 98, 100, and 104 through 110 violate the optimal inclusion distances of the crowds 98, 100, and 104 through 110. In this example, as a result of the user leaving the crowd 98 and moving to his new location, both of the remaining members of the crowd 98 violate the optimal inclusion distance of the crowd 98. As such, the crowd analyzer 58 removes the remaining users from the crowd 98 and creates crowds 112 and 114 of one user each for those users, as illustrated in FIG. 10C.

Figure 10D:
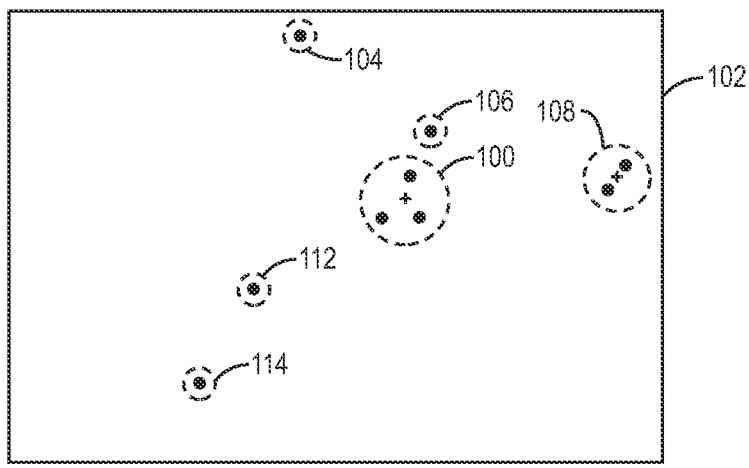

The crowd analyzer 58 then identifies the two closest crowds in the bounding box 102, which in this example are the crowds 108 and 110. Next, the crowd analyzer 58 computes a distance between the two crowds 108 and 110. In this example, the distance between the two crowds 108 and 110 is less than the initial optimal inclusion distance and, as such, the two crowds 108 and 110 are combined. In this example, crowds are combined by merging the smaller crowd into the larger crowd. Since the two crowds 108 and 110 are of the same size, the crowd analyzer 58 merges the crowd 110 into the crowd 108, as illustrated in FIG. 10D. A new crowd center and new optimal inclusion distance are then computed for the crowd 108.

Figure 10E:
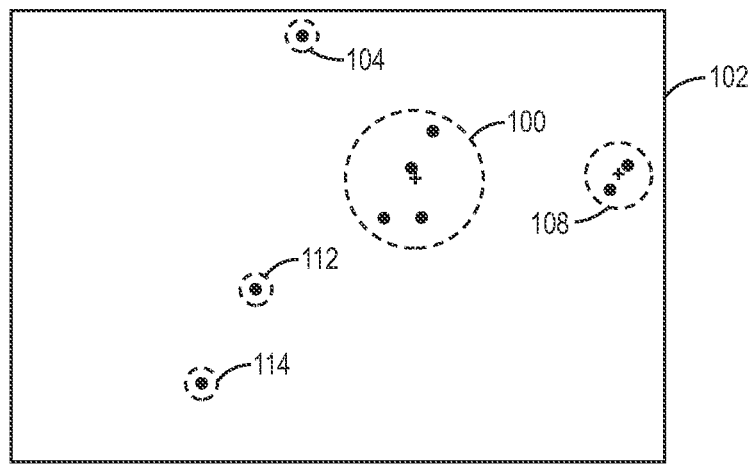
Figure 10F:
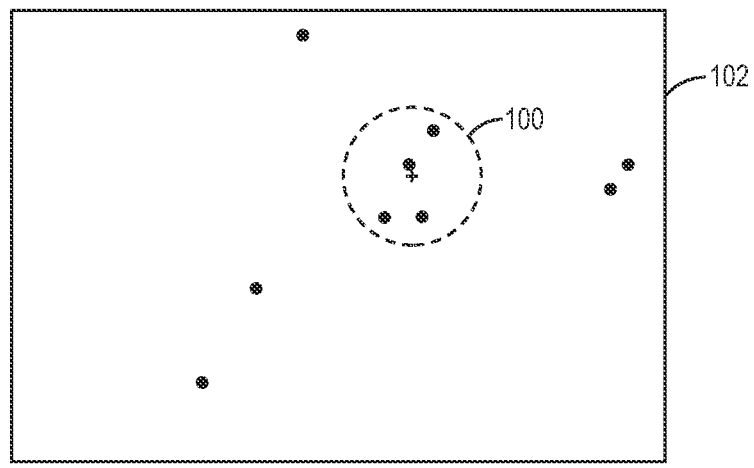

At this point, the crowd analyzer 58 repeats the process and determines that the crowds 100 and 106 are now the two closest crowds. In this example, the distance between the two crowds 100 and 106 is less than the optimal inclusion distance of the larger of the two crowds 100 and 106, which is the crowd 100. As such, the crowd 106 is merged into the crowd 100 and a new crowd center and optimal inclusion distance are computed for the crowd 100, as illustrated in FIG. 10E. At this point, there are no two crowds closer than the optimal inclusion distance of the larger of the two crowds. As such, the crowd analyzer 58 discards any crowds having less than three members, as illustrated in FIG. 10F. In this example, the crowds 104, 108, 112, and 114 have less than three members and are therefore removed. The crowd 100 has three or more members and, as such, is not removed. At this point, the crowd formation process is complete.

Figure 11A:
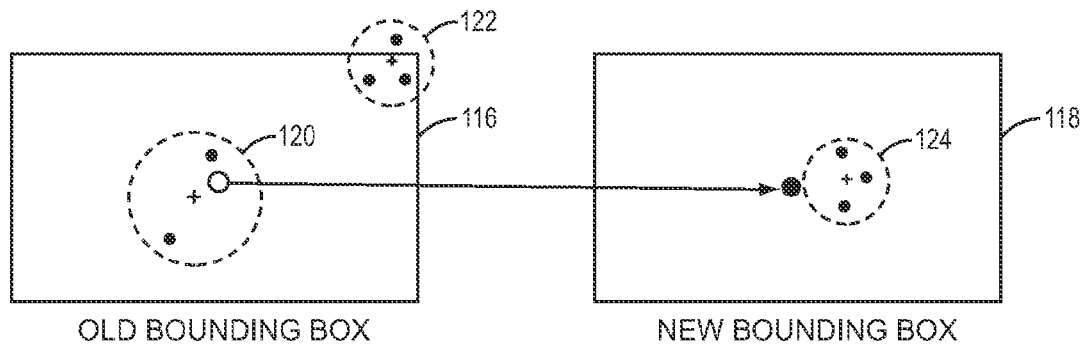

FIGS. 11A through 11E graphically illustrate the crowd formation process of FIGS. 8A through 8D in a scenario where the new and old bounding boxes do not overlap. As illustrated in FIG. 11A, in this example, the user moves from an old location to a new location. The crowd analyzer 58 creates an old bounding box 116 for the old location of the user and a new bounding box 118 for the new location of the user. Crowds 120 and 122 exist in the old bounding box 116, and crowd 124 exists in the new bounding box 118. In this example, since the old and new bounding boxes 116 and 118 do not overlap, the crowd analyzer 58 processes the old and new bounding boxes 116 and 118 separately.

Figure 11B:
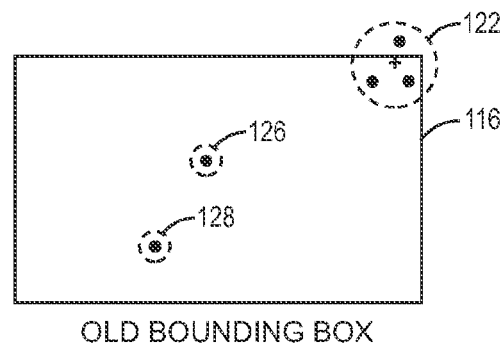
Figure 11C:
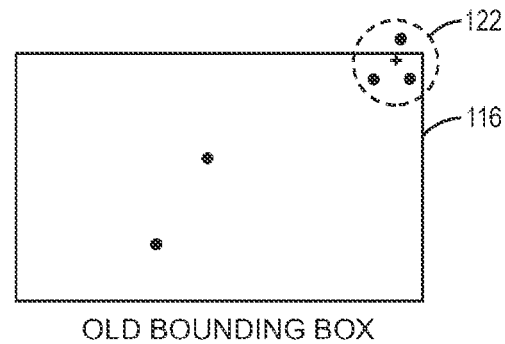

More specifically, as illustrated in FIG. 11B, as a result of the movement of the user from the old location to the new location, the remaining users in the crowd 120 no longer satisfy the optimal inclusion distance for the crowd 120. As such, the remaining users in the crowd 120 are removed from the crowd 120, and crowds 126 and 128 of one user each are created for the removed users as shown in FIG. 11C. In this example, no two crowds in the old bounding box 116 are close enough to be combined. As such, crowds having less than three users are removed, and processing of the old bounding box 116 is complete, and the crowd analyzer 58 proceeds to process the new bounding box 118.

Figure 11D:
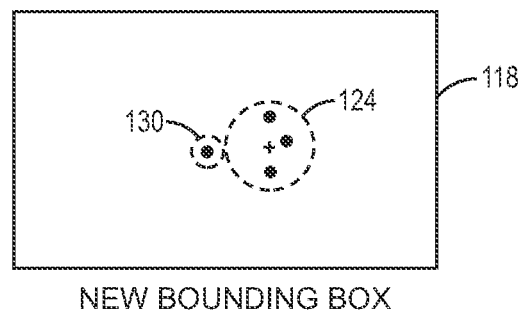
Figure 11E:
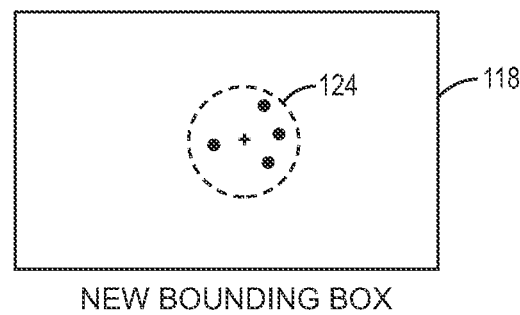

As illustrated in FIG. 11D, processing of the new bounding box 118 begins by the crowd analyzer 58 creating a crowd 130 of one user for the user. The crowd analyzer 58 then identifies the crowds 124 and 130 as the two closest crowds in the new bounding box 118 and determines a distance between the two crowds 124 and 130. In this example, the distance between the two crowds 124 and 130 is less than the optimal inclusion distance of the larger crowd, which is the crowd 124. As such, the crowd analyzer 58 combines the crowds 124 and 130 by merging the crowd 130 into the crowd 124, as illustrated in FIG. 11E. A new crowd center and new optimal inclusion distance are then computed for the crowd 124. At this point, the crowd formation process is complete. Note that the crowd formation processes described above with respect to FIGS. 6 through 11D are exemplary. The present disclosure is not limited thereto. Any type of crowd formation process may be used.

FIG. 12 illustrates the operation of the system 10 to provide a GUI that represents a reference location and nearby crowds of users according to one embodiment of the present disclosure. Note that while in this example the request is initiated by the MAP application 32 of the mobile device 18, the present disclosure is not limited thereto. In a similar manner, requests may be received from the third-party application 34 of the mobile device 18 and/or from the subscriber device 22.

First, the MAP application 32 of the mobile device 18 sends a crowd request to the MAP server 12 via the MAP client 30 of the mobile device 18 (step 1400). The crowd request is a request for crowd data for crowds currently formed at or near a specified reference location. The crowd request may be initiated by the user 20 of the mobile device 18 via the MAP application 32 or may be initiated automatically by the MAP application 32 in response to an event such as, for example, start-up of the MAP application 32, movement of the user 20, or the like. The reference location specified by the crowd request may be the current location of the user 20, a POI selected by the user 20, a POI selected by the MAP application 32, a POI implicitly defined via a separate application (e.g., the POI is implicitly defined as the location of the nearest Starbucks coffee house in response to the user 20 performing a Google search for "Starbucks"), an arbitrary location selected by the user 20, or the like.

In response to receiving the crowd request, the MAP server 12 identifies one or more crowds relevant to the crowd request (step 1402). More specifically, in one embodiment, the crowd analyzer 58 performs a crowd formation process such as that described above in FIG. 6 to form one or more crowds relevant to the reference location specified by the crowd request. In another embodiment, the crowd analyzer 58 proactively forms crowds using a process such as that described above in FIGS. 8A through 8D and stores corresponding crowd records in the datastore 64 of the MAP server 12. Then, rather than forming the relevant crowds in response to the crowd request, the crowd analyzer 58 queries the datastore 64 to identify the crowds that are relevant to the crowd request. The crowds relevant to the crowd request may be those crowds within or intersecting a bounding region, such as a bounding box, for the crowd request. The bounding region is a geographic region of a predefined shape and size centered at the reference location. A crowd may be determined to be within or intersecting the bounding region if, for example, a crowd center of the crowd is located within the bounding region, at least one user in the crowd is currently located within the bounding region, a bounding box for the crowd (e.g., a box passing through the northwest- and southeast-most users in the crowd) is within or intersects the bounding region, or the like.

Once the crowd analyzer 58 has identified the crowds relevant to the crowd request, the MAP server 12 obtains crowd data for the relevant crowds (step 1404). The crowd data for the relevant crowds includes spatial information that defines the locations of the relevant crowds. The spatial information that defines the location of a crowd is any type of information that defines the geographic location of the crowd. For example, the spatial information may include the crowd center of the crowd, a closest street address to the crowd center of the crowd, a POI at which the crowd is located, or the like. In addition, the crowd data for the relevant crowds may include aggregate profiles for the relevant crowds, information characterizing the relevant crowds, or both. An aggregate profile for a crowd is generally an aggregation, or combination, of the user profiles of the users 20 in the crowd. For example, in one embodiment, the aggregate profile of a crowd includes, for each keyword of at least a subset of the keywords in the user profile of the user 20 of the mobile device 18 that issued the crowd request, a number of user matches for the keyword (i.e., a number of the users 20 in the crowd that have user profiles that include a matching keyword) or a ratio of the number of user matches for the keyword to a total number of users in the crowd. The MAP server 12 then returns the crowd data to the mobile device 18 (step 1406).

Upon receiving the crowd data, the MAP application 32 of the mobile device 18 assigns each of the relevant crowds to one of a number of concentric geographic regions centered at the reference location (step 1408). More specifically, for each of the relevant crowds, the MAP application 32 assigns the relevant crowd to the one of the concentric geographic regions in which the crowd is located. In one embodiment, the concentric geographic regions are two or more concentric circular geographic regions that are centered at the reference location. The size of the concentric geographic regions (e.g., the radii of the concentric circular geographic regions) may be predefined static values or dynamic values. For instance, the size of the concentric geographic regions may be a function of the size of the bounding region for the crowd request, where the bounding region for the crowd request may be configured by the user 20 of the mobile device 18. As another example, the size of the concentric geographic regions may be a function of the number of concentric geographic regions (e.g., two concentric geographic regions versus three concentric geographic regions), which may be specified by the user 20 at the time of the crowd request or dynamically controlled by the user 20 during presentation of the GUI (see below).

Next, the MAP application 32 generates and presents a GUI that includes a number of concentric display regions that correspond to the concentric geographic regions, where a select one of the concentric display regions provides an expanded view of the relevant crowds located within the corresponding geographic region and the remaining one(s) of the concentric display regions provide collapsed view(s) of the relevant crowds in the corresponding geographic region(s) (step 1410). In one preferred embodiment, in the selected display region, the expanded view is provided by displaying crowd representations in the selected display region that represent the relevant crowds in the corresponding geographic region, where the crowd representations represent, or at least substantially represent, both relative distances within the corresponding geographic region between the reference location and the corresponding crowds and relative bearings within the corresponding geographic region from the reference location to the corresponding crowds. In contrast, for each non-selected display region, the collapsed view is provided by displaying crowd representations in the non-selected display region that represent the relevant crowds in the corresponding geographic region, where the crowd representations represent the relative bearings within the corresponding geographic region from the reference location to the corresponding crowds. However, the crowd representations in the non-selected display region do not represent the relative distances within the corresponding geographic region between the reference location and the corresponding crowds. In other words, even though the actual distances between the crowds represented by the crowd representations in the non-selected display region and the reference location may be different, in the collapsed view, the crowd representations are equidistant, or at least substantially equidistant, from a point in the GUI that corresponds to the reference location. In one exemplary alternative, the crowd representations in the non-selected display region may represent relative distances of the corresponding crowds from reference location but in an attenuated manner such that the crowd representations fit within the non-selected display area.

In this embodiment, the MAP application 32 next receives user input from the user 20 of the mobile device 18 that selects a different display region from the concentric display regions (step 1412). In response, the MAP application 32 updates the GUI (step 1414). More specifically, the MAP application 32 updates the GUI such that the newly selected display region provides an expanded view of the crowds located in the corresponding geographic region. The previously selected display region is also updated to provide a collapsed view of the crowds located in the corresponding geographic region. As such, in this embodiment, at any one time, only one of the display regions is selected to provide an expanded view of the relevant crowds located in the corresponding geographic region while all of the remaining display regions provide collapsed view(s) of the relevant crowds located in the corresponding geographic region(s).

FIGS. 13A through 13C illustrate an exemplary GUI 132 provided by the MAP application 32 in the process of FIG. 12 according to one embodiment of the present disclosure. As illustrated in FIG. 13A, the GUI 132 includes three concentric display regions 134, 136, and 138 centered at the reference location, which is represented by a reference location indicator 140. The three concentric display regions 134, 136, and 138 correspond to three concentric geographic regions. In FIG. 13A, the display region 134 is selected. In this example, the display region 134 corresponds to a geographic region that is within walking distance from the reference location (e.g., has a radius of 1 mile). Because the display region 134 is selected, the display region 134 provides an expanded view of the relevant crowds located within the corresponding geographic region. More specifically, the relevant crowds located within the geographic region corresponding to the display region 134 are represented by crowd representations 142 through 158. In the expanded view, the crowd representations 142 through 158 represent, or at least substantially represent, both relative distances within the corresponding geographic region between the reference location and the corresponding crowds and relative bearings within the corresponding geographic region from the reference location to the corresponding crowds.

In contrast, because the display regions 136 and 138 are not selected, the display regions 136 and 138 provide collapsed views of the relevant crowds in the corresponding geographic regions. More specifically, in this example, the relevant crowds located within the geographic region corresponding to the display region 136 are represented by crowd representations 160 and 162. In the collapsed view, the crowd representations 160 and 162 represent the relative bearings within the corresponding geographic region from the reference location to the corresponding crowds. However, the crowd representations 160 and 162 do not represent the relative distances within the corresponding geographic region between the reference location and the corresponding crowds. In other words, even though the actual distances between the crowds represented by the crowd representations 160 and 162 and the reference location may be different, in the collapsed view, the crowd representations 160 and 162 are equidistant, or at least substantially equidistant, from the reference location indicator 140.

Likewise, in this example, the relevant crowds located within the geographic region corresponding to the display region 138 are represented by crowd representations 164 and 166. In the collapsed view, the crowd representations 164 and 166 represent the relative bearings within the corresponding geographic region from the reference location and the corresponding crowds. However, the crowd representations 164 and 166 do not represent the relative distances within the corresponding geographic region between the reference location and the corresponding crowds. In other words, even though the actual distances between the crowds represented by the crowd representations 164 and 166 and the reference location may be different, in the collapsed view, the crowd representations 164 and 166 are equidistant, or at least substantially equidistant, from the reference location indicator 140.

FIG. 13B illustrates the GUI 132 when the display region 136 is selected according to one embodiment of the present disclosure. In this example, the display region 136 corresponds to a geographic region that is within bicycling distance from the reference location (e.g., has a radius of 2 miles). Because the display region 136 is selected, the display region 136 provides an expanded view of the relevant crowds located within the corresponding geographic region. More specifically, in the expanded view, the crowd representations 160 and 162 represent, or at least substantially represent, both relative distances within the corresponding geographic region between the reference location and the corresponding crowds and relative bearings within the corresponding geographic region from the reference location and the corresponding crowds. In other words, whereas in FIG. 13A the crowd representations 160 and 162 are equidistant, or at least substantially equidistant, from the reference location indicator 140, the crowd representations 160 and 162 in FIG. 13B reflect the differing distances between the corresponding crowds and the reference location.

In contrast, because the display regions 134 and 138 are not selected, the display regions 134 and 138 provide collapsed views of the relevant crowds in the corresponding geographic regions. More specifically, in the collapsed view, the crowd representations 142 through 158 represent the relative bearings within the corresponding geographic region from the reference location and the corresponding crowds. However, the crowd representations 142 through 158 do not represent the relative distances within the corresponding geographic region between the reference location and the corresponding crowds. In other words, even though the actual distances between the crowds represented by the crowd representations 142 through 158 and the reference location may be different, in the collapsed view, the crowd representations 142 through 158 are equidistant, or at least substantially equidistant, from the reference location indicator 140.

Likewise, in the collapsed view, the crowd representations 164 and 166 represent the relative bearings within the corresponding geographic region from the reference location and the corresponding crowds. However, the crowd representations 164 and 166 do not represent the relative distances within the corresponding geographic region between the reference location and the corresponding crowds. In other words, even though the actual distances between the crowds represented by the crowd representations 164 and 166 and the reference location may be different, in the collapsed view, the crowd representations 164 and 166 are equidistant, or at least substantially equidistant, from the reference location indicator 140.

FIG. 13C is a blow-up view of the crowd representations 142 through 158 from FIG. 13A that illustrates placement of the crowd representations 142 through 158 using a collision avoidance scheme according to one embodiment of the present disclosure. In this example, the relevant crowds represented by the crowd representations 142 through 158 are determined to be sufficiently close to one another to result in a collision in terms of display of corresponding crowd representations in the GUI 132. As a result, a collision avoidance process is utilized to group the crowd representations 142 through 158 in a manner that avoids collision of the crowd representations 142 through 158. In this example, the collision avoidance process places a group center indicator 168 at a central point for the group of crowds. In one example, the group center indicator 168 corresponds to a location computed based on the locations of the crowds and a center of mass algorithm. The crowd representations 142 through 158 are then positioned around the group center indicator 168 in an outward spiral pattern that maximizes the number of crowd representations that can be displayed while still allowing interactivity with as many of the crowd representations as possible. The order of the crowd representations 142 through 158 in the spiral pattern may be random, arbitrary, or intelligently decided based on the locations of the corresponding crowds.

It should be noted that other collision avoidance schemes may additionally or alternatively be used. As a first example, a z-order of the crowd representations 142 through 158 can be controlled based on attributes of the corresponding crowds such as, for example, the locations of the crowds. As a second example, the distances of the crowd representations 142 through 158 from the group center may be scaled to a non-linear scale in order to provide more space for displaying and interacting with the crowd representations 142 through 158. As a final example, as the user 20 interacts with the GUI 132 to attempt to select one of the crowd representations 142 through 158, which crowd representation of the crowd representations 142 through 158 that is selected may be intelligently controlled to assist the user 20 in selecting a desired crowd representation if the user 20 repeatedly tries to select a desired crowd representation at a particular location within the GUI 132.

It should also be noted that the positions of the crowd representations 142 through 166 within the GUI 132 may be adjusted based upon empty space within the GUI 132 or a more uniform division of the display area in order to make better use of the display area. Also, in addition to or as an alternative to grouping crowd representations when there is a collision, crowd representations may be grouped based on their relations to one another. For example, crowd representations for two crowds may be grouped if a user in one of the crowds is a friend of one of the users in the other crowd, if the two crowds are at the same POI, or if the two crowds are at two POIs within the same AOI.

FIG. 14 illustrates the operation of the system of FIG. 1 to provide a GUI that represents crowds near a reference location according to another embodiment of the present disclosure. In this embodiment, rather than generating the GUI at the mobile device 18, the GUI is generated at the MAP server 12. In this example, the crowd request originates from the subscriber device 22.

More specifically, first, the subscriber device 22 sends a crowd request to the MAP server 12 (step 1500). In one embodiment, the crowd request is sent via the web browser 38 of the subscriber device 22. As discussed above, the crowd request is a request for crowd data for crowds currently formed at or near a specified reference location. The reference location in this embodiment is preferably a location selected by the subscriber 24. However, the reference location is not limited thereto.

In response to receiving the crowd request, the MAP server 12 identifies one or more crowds relevant to the crowd request (step 1502) and obtains crowd data for the relevant crowds (step 1504). Again, the crowd data for the relevant crowds includes spatial information that defines the locations of the crowds. In addition, the crowd data may include aggregate profiles for the crowds, information characterizing the crowds, or both.

Next, the crowd analyzer 58 of the MAP server 12 assigns each of the relevant crowds to one of a number of concentric geographic regions centered at the reference location (step 1506). More specifically, for each of the relevant crowds, the MAP application 32 assigns the relevant crowd to the one of the concentric geographic regions in which the crowd is located. The crowd analyzer 58 then generates a GUI that includes a number of concentric display regions that correspond to the concentric geographic regions, where a select one of the concentric display regions provides an expanded view of the relevant crowds located within the corresponding geographic region and the remaining one(s) of the concentric display regions provide collapsed view(s) of the relevant crowds in the corresponding geographic region(s) (step 1508). The MAP server 12 then delivers the GUI to the subscriber device 22 (step 1510), where the GUI is presented to the subscriber 24 via, for example, the web browser 38 (step 1512).

In this embodiment, the subscriber device 22 next receives user input from the subscriber 24 that selects a different display region from the concentric display regions (step 1514) and provides the selection to the MAP server (step 1516). In response, the MAP server 12 updates the GUI (step 1518) and delivers the updated GUI to the subscriber device 22 (step 1520). The subscriber device 22 then presents the updated GUI to the subscriber 24 via, for example, the web browser 38 (step 1522).

FIG. 15 is a block diagram of the MAP server 12 according to one embodiment of the present disclosure. As illustrated, the MAP server 12 includes a controller 170 connected to memory 172, one or more secondary storage devices 174, and a communication interface 176 by a bus 178 or similar mechanism. The controller 170 is a microprocessor, digital Application Specific Integrated Circuit (ASIC), Field Programmable Gate Array (FPGA), or similar hardware component. In this embodiment, the controller 170 is a microprocessor, and the application layer 40, the business logic layer 42, and the object mapping layer 62 (FIG. 2) are implemented in software and stored in the memory 172 for execution by the controller 170. Further, the datastore 64 (FIG. 2) may be implemented in the one or more secondary storage devices 174. The secondary storage devices 174 are digital data storage devices such as, for example, one or more hard disk drives. The communication interface 176 is a wired or wireless communication interface that communicatively couples the MAP server 12 to the network 28 (FIG. 1). For example, the communication interface 176 may be an Ethernet interface, local wireless interface such as a wireless interface operating according to one of the suite of IEEE 802.11 standards, or the like.

FIG. 16 is a block diagram of one of the mobile devices 18 according to one embodiment of the present disclosure. As illustrated, the mobile device 18 includes a controller 180 connected to memory 182, a communication interface 184, one or more user interface components 186, and the location function 36 by a bus 188 or similar mechanism. The controller 180 is a microprocessor, digital ASIC, FPGA, or similar hardware component. In this embodiment, the controller 180 is a microprocessor, and the MAP client 30, the MAP application 32, and the third-party applications 34 are implemented in software and stored in the memory 182 for execution by the controller 180. In this embodiment, the location function 36 is a hardware component such as, for example, a GPS receiver. The communication interface 184 is a wireless communication interface that communicatively couples the mobile device 18 to the network 28 (FIG. 1). For example, the communication interface 184 may be a local wireless interface such as a wireless interface operating according to one of the suite of IEEE 802.11 standards, a mobile communications interface such as a cellular telecommunications interface, or the like. The one or more user interface components 186 include, for example, a touchscreen, a display, one or more user input components (e.g., a keypad), a speaker, or the like, or any combination thereof.

FIG. 17 is a block diagram of the subscriber device 22 according to one embodiment of the present disclosure. As illustrated, the subscriber device 22 includes a controller 190 connected to memory 192, one or more secondary storage devices 194, a communication interface 196, and one or more user interface components 198 by a bus 200 or similar mechanism. The controller 190 is a microprocessor, digital ASIC, FPGA, or similar hardware component. In this embodiment, the controller 190 is a microprocessor, and the web browser 38 (FIG. 1) is implemented in software and stored in the memory 192 for execution by the controller 190. The one or more secondary storage devices 194 are digital storage devices such as, for example, one or more hard disk drives. The communication interface 196 is a wired or wireless communication interface that communicatively couples the subscriber device 22 to the network 28 (FIG. 1). For example, the communication interface 196 may be an Ethernet interface, local wireless interface such as a wireless interface operating according to one of the suite of IEEE 802.11 standards, a mobile communications interface such as a cellular telecommunications interface, or the like. The one or more user interface components 198 include, for example, a touchscreen, a display, one or more user input components (e.g., a keypad), a speaker, or the like, or any combination thereof.

FIG. 18 illustrates a more general process for generating and presenting a GUI that represents a reference item and a number of items of interest according to one embodiment of the present disclosure. This process may be performed by a user device (e.g., a mobile device similar to the mobile devices 18), a server computer, or a combination thereof. First, a reference item is identified (step 1600). The reference item is generally any item having one or more attributes that may be used to represent the reference item in, or map the reference item into, two-dimensional space. For example, the reference item may be a person, POI, or location that can be represented in two-dimensional geographic space (e.g., via corresponding latitude and longitude coordinates, street addresses, or the like). However, the reference item is not limited to items that can be represented in two-dimensional geographic space. The reference item may be other types of items such as, for example, a computer (either ideal or real) that can be represented in two-dimensional space based on one or more specifications (i.e., attributes) of the computer. For instance, a computer may be mapped to a two-dimensional space based on processing power and memory attributes of the computer (e.g., processing power may be represented by the X-axis in two-dimensional space and memory capacity may be represented by the Y-axis in two-dimensional space).

Next, a number of items of interest are identified (step 1602). The items of interest are generally other items having the same attributes as the reference item. For example, if the reference item is an ideal computer, the items of interest may be real computers that are commercially available. Each of the items of interest is then assigned to one of a number of concentric regions in the two-dimensional space centered at the location of the reference item in the two-dimensional space based on the attributes of the item of interest (step 1604). Note that the attribute(s) of the item of interest represents the location of the item of interest in the two-dimensional space. As such, the item of interest is assigned to the concentric region in the two-dimensional space in which the item of interest is located as determined by the attribute(s) of the item of interest. Also note that if more than two attributes of the reference item and the items of interest are to be compared, the reference item and the items of interest may be mapped to the two-dimensional space using an appropriate mapping scheme.

A GUI that represents the reference item and the items of interest is then generated such that the GUI includes concentric display regions that correspond to the concentric regions within the two-dimensional space, where a select one of the concentric display regions provides an expanded view of the items of interest located within the corresponding region in the two-dimensional space and the remaining ones of the concentric display region(s) provide collapsed view(s) of the items of interest located within the corresponding region(s) in the two-dimensional space (step 1606). The GUI is then presented to a user (step 1608). User input may then be received from the user to select a different one of the concentric display regions (step 1610). In response, the GUI is updated such that the newly selected display region provides an expanded view of the items of interest in the corresponding region of the two-dimensional space while the other one(s) of the concentric display regions provide collapsed view(s) of the items of interest located in the corresponding region(s) of the two-dimensional space (step 1612). The updated GUI is then presented to the user (step 1614).

While the discussion above mentions an example where the reference item is a reference computer and the items of interest are other computers to be compared to the reference computer, numerous other examples will be apparent to one of ordinary skill in the art upon reading this disclosure. As a first example, as discussed above with respect to FIG. 12, the reference item may be a reference location, and the items of interest may be crowds of users. As a second example, the reference item may be a reference location, and the items of interest may be POIs. As a third example, the reference item may be a user, and the items of interest may be friends, or at least a subset of the friends, of the user in a social network. In this example, the attributes of the user and his friends represented in the GUI may be the locations of the user and his friends. As a fourth example, the reference item may be a user, and the items of interest may be friends and friends-of-friends of the user in a social network. In this example, the attributes of the user and his friends and friends-of-friends represented in the GUI may be the locations of the user and his friends and friends-of-friends. Alternatively, the attributes of the user and his friends and friends-of-friends represented in the GUI may be social network distance (i.e., degree of separation) between the user and his friends and friends-of-friends and degree of similarity between the user profiles of the user and his friends and friends-of-friends. Note that these examples are provided for illustrative purposes only and are not intended to provide an exhaustive list of the types of items that may be represented in the GUI disclosed herein. Numerous other examples will be apparent to one of ordinary skill in the art upon reading this disclosure and are to be considered within the scope of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method comprising:
    assigning each item of interest of a plurality of items of interest to one of a plurality of concentric regions in a two-dimensional geographic space based on a location of the item of interest in the two-dimensional geographic space, wherein the location of the item of interest is determined based on one or more attributes of the item of interest, the plurality of concentric regions are centered at a location of a reference item in the two-dimensional geographic space, and the location of the reference item is determined based on one or more attributes of the reference item that correspond to the one or more attributes of the item of interest;
    generating a Graphical User Interface (GUI) that represents the reference item and the plurality of items of interest in the two-dimensional geographic space such that the GUI includes a plurality of concentric display regions that correspond to the plurality of concentric regions in the two-dimensional geographic space, a select one of the plurality of concentric display regions provides an expanded view of one or more of the plurality of items of interest located in a corresponding one of the plurality of concentric regions in the two-dimensional geographic space, and each remaining one of the plurality of concentric display regions provides a collapsed view of one or more of the plurality of items of interest located in a corresponding one of the plurality of concentric regions in the two-dimensional geographic space;
    wherein changing a concentric display region from an expanded view to a collapsed view changes a location of an item of interest in the changed concentric display region to a location unrelated to the relative distance of the item of interest from the reference item while maintaining substantially a same bearing relative to the location of the reference item as the item of interest would be shown at in the expanded view; and
    effecting presentation of the GUI to a user.

2. The method of claim 1 wherein the plurality of concentric display regions are centered on an indicator that represents the location of the reference item in the two-dimensional geographic space.

3. The method of claim 2 wherein, in order to provide the expanded view, the select one of the plurality of concentric display regions comprises one or more item representations that represent:
    relative distances within the corresponding one of the plurality of concentric regions in the two-dimensional geographic space between the locations of the one or more of the plurality of items of interest in the corresponding one of the plurality of concentric regions in the two-dimensional geographic space and the location of the reference item in the two-dimensional geographic space; and
    bearings within the two-dimensional geographic space from the location of the reference item in the two-dimensional geographic space to the locations of the one or more of the plurality of items of interest in the corresponding one of the plurality of concentric regions in the two-dimensional geographic space.

4. The method of claim 3 wherein providing the GUI comprises performing a collision avoidance process by which item representations of two or more of the plurality of items of interest in the one of the plurality of concentric regions in the two-dimensional geographic space that corresponds to the select one of the plurality of concentric display regions are positioned in such a manner as to at least substantially avoid collision of the item representations in the GUI.

5. The method of claim 2 wherein, in order to provide the collapsed view for each remaining one of the plurality of concentric display regions, the remaining one of the plurality of concentric display regions comprises one or more item representations that are at least substantially equidistant from the indicator that represents the location of the reference item in the two-dimensional geographic space.

6. The method of claim 1 wherein the reference item is a reference location and the plurality of items of interest comprise a plurality of crowds of users.

7. The method of claim 6 wherein:
    the plurality of concentric display regions in the two-dimensional geographic space is a plurality of concentric geographic regions in the two-dimensional geographic space centered at the reference location;
    assigning each item of interest of the plurality of items of interest to one of the plurality of concentric regions in the two-dimensional geographic space comprises assigning each crowd of the plurality of crowds to one of the plurality of concentric geographic regions based on spatial information that defines a location of the crowd; and
    generating the GUI comprises generating the GUI such that the plurality of concentric display regions correspond to the plurality of concentric geographic regions, the select one of the plurality of concentric display regions provides the expanded view of one or more of the plurality of crowds located within a corresponding one of the plurality of concentric geographic regions, and each remaining one of the plurality of concentric display regions provides a collapsed view of one or more of the plurality of crowds located within a corresponding one of the plurality of concentric geographic regions.

8. The method of claim 1 wherein the reference item is a reference location and the plurality of items of interest comprise a plurality of Points of Interest (POIs).

9. The method of claim 1 wherein the reference item is a reference location and the plurality of items of interest comprise a plurality of friends of the user in a social network.

10. The method of claim 1 wherein the reference item is a reference location and the plurality of items of interest comprise a plurality of friends and friends-of-friends of the user in a social network.

11. The method of claim 1 wherein the plurality of items of interest comprise a plurality of commercially available items.

12. The method of claim 1 wherein effecting presentation of the GUI to the user comprises presenting the GUI to the user.

13. The method of claim 1 wherein effecting presentation of the GUI to the user comprises sending the GUI to a computing device of the user via a network.

14. A computing device comprising:
a controller adapted to: assign each item of interest of a plurality of items of interest to one of a plurality of concentric regions in a two-dimensional geographic space based on a location of the item of interest in the two-dimensional geographic space, wherein the location of the item of interest is determined based on one or more attributes of the item of interest, the plurality of concentric regions are centered at a location of a reference item in the two-dimensional geographic space, and the location of the reference item is determined based on one or more attributes of the reference item that correspond to the one or more attributes of the item of interest;
generate a Graphical User Interface (GUI) that represents the reference item and the plurality of items of interest in the two-dimensional geographic space such that the GUI includes a plurality of concentric display regions that correspond to the plurality of concentric regions in the two-dimensional geographic space, a select one of the plurality of concentric display regions provides an expanded view of one or more of the plurality of items of interest located in a corresponding one of the plurality of concentric display regions in the two-dimensional geographic space, and each remaining one of the plurality of concentric display regions provides a collapsed view of one or more of the plurality of items of interest located in a corresponding one of the plurality of concentric regions in the two-dimensional geographic space;
wherein changing a concentric display region from an expanded view to a collapsed view changes a location of an item of interest in the changed concentric display region to a location unrelated to the relative distance of the item of interest from the reference item while maintaining substantially a same bearing relative to the location of the reference item as the item of interest would be shown at in the expanded view; and
effect presentation of the GUI to a user.

15. The computing device of claim 14 wherein the computing device is a user device further comprising a display associated with the controller, and the controller is adapted to effect presentation of the GUI to the user by presenting the GUI via the display of the user device.

16. The computing device of claim 14 wherein the computing device is a server computer further comprising a communication interface adapted to communicatively couple the server computer to a user device of the user via a network, and the controller of the server computer is adapted to effect presentation of the GUI to the user by sending the GUI to the user device of the user via the network.

17. A non-transitory computer-readable medium storing software for instructing a controller of a computing device to:
assign each item of interest of a plurality of items of interest to one of a plurality of concentric regions in a two-dimensional geographic space based on a location of the item of interest in the two-dimensional geographic space, wherein the location of the item of interest is determined based on one or more attributes of the item of interest, the plurality of concentric regions are centered at a location of a reference item in the two-dimensional geographic space, and the location of the reference item is determined based on one or more attributes of the reference item that correspond to the one or more attributes of the item of interest;
generate a Graphical User Interface (GUI) that represents the reference item and the plurality of items of interest in the two-dimensional geographic space such that the GUI includes a plurality of concentric display regions that correspond to the plurality of concentric regions in the two-dimensional geographic space, a select one of the plurality of concentric display regions provides an expanded view of one or more of the plurality of items of interest located in a corresponding one of the plurality of concentric display regions in the two-dimensional geographic space, and each remaining one of the plurality of concentric display regions provides a collapsed view of one or more of the plurality of items of interest located in a corresponding one of the plurality of concentric regions in the two-dimensional geographic space;
wherein changing a concentric display region from an expanded view to a collapsed view changes a location of an item of interest in the changed concentric display region to a location unrelated to the relative distance of the item of interest from the reference item while maintaining substantially a same bearing relative to the location of the reference item as the item of interest would be shown at in the expanded view; and
effect presentation of the GUI to a user.

18. The non-transitory computer-readable medium of claim 17 wherein the computing device is a user device comprising a display associated with the controller, and the software instructs the controller to effect presentation of the GUI to the user by presenting the GUI via the display of the user device.

19. The non-transitory computer-readable medium of claim 17 wherein the computing device is a server computer comprising a communication interface adapted to communicatively couple the server computer to a user device of the user via a network, and the software instructs the controller of the server computer to effect presentation of the GUI to the user by sending the GUI to the user device of the user via the network.

* * * * *